(12) United States Patent
Inditsky

(10) Patent No.: US 7,748,882 B2
(45) Date of Patent: Jul. 6, 2010

(54) ULTRA THIN RADIATION MANAGEMENT AND DISTRIBUTION SYSTEMS WITH HYBRID OPTICAL WAVEGUIDE

(76) Inventor: Ben-Zion Inditsky, 3 Nesi'Im Street ap. 24, Holon (IL) 58322

( * ) Notice: Subject to any disclaimer, the term of this patent is extended or adjusted under 35 U.S.C. 154(b) by 331 days.

(21) Appl. No.: 11/818,245

(22) Filed: Jun. 14, 2007

(65) Prior Publication Data

US 2007/0274091 A1 Nov. 29, 2007

Related U.S. Application Data

(62) Division of application No. 10/191,372, filed on Jul. 2, 2002, now Pat. No. 7,263,268.

(60) Provisional application No. 60/307,204, filed on Jul. 23, 2001.

(51) Int. Cl.
  *F21V 7/04* (2006.01)
  *F21V 8/00* (2006.01)
  *G02B 6/42* (2006.01)

(52) U.S. Cl. .................. 362/551; 362/235; 362/613; 385/901

(58) Field of Classification Search ............ 362/551, 362/558, 559, 560, 576, 608, 609, 610, 613, 362/621, 555, 628; 385/26, 32, 901
See application file for complete search history.

(56) References Cited

U.S. PATENT DOCUMENTS

| | | | |
|---|---|---|---|
| 4,576,436 A * | 3/1986 | Daniel ............ | 385/25 |
| 4,585,298 A * | 4/1986 | Mori ............. | 362/551 |
| 5,631,994 A * | 5/1997 | Appeldorn et al. ... | 362/551 |
| 5,857,761 A * | 1/1999 | Abe et al. ........ | 362/551 |
| 5,926,601 A * | 7/1999 | Tai et al. ........ | 362/551 |
| 6,086,235 A * | 7/2000 | Chen ............ | 362/565 |
| 6,137,928 A * | 10/2000 | Albrecht ......... | 385/31 |
| 6,241,358 B1 * | 6/2001 | Higuchi et al. .... | 362/613 |
| 6,464,367 B2 * | 10/2002 | Ito et al. ........ | 362/613 |
| 6,481,882 B1 * | 11/2002 | Pojar ............ | 362/559 |
| 6,520,655 B2 * | 2/2003 | Ohuchi .......... | 362/612 |
| 6,550,952 B1 * | 4/2003 | Hulse et al. ...... | 362/560 |
| 6,655,823 B2 * | 12/2003 | Chang ........... | 362/487 |

FOREIGN PATENT DOCUMENTS

JP 06059128 A * 3/1994

\* cited by examiner

*Primary Examiner*—Alan Cariaso

(57) ABSTRACT

A thin-profile, optically efficient lighting device for use with, among other things, flat information displays, includes a combination of three optically coupled light propagating structures, fabricated of electromagnetic flux transmitting materials. The first structure may be a generally elongated optical pipe adapted to receive light from at least one light source such as a light emitting diode. Radiation from additional sources is coupled into the first structure by a second structure which injects the radiation thereinto. Light injected into the first structure is directed into the third structure where it is redirected so that it propagates out of the third structure uniformly and efficiently and in a direction that is substantially perpendicular to the surface of the third structure. A device can include multiple bodies of any or all three structures.

11 Claims, 32 Drawing Sheets

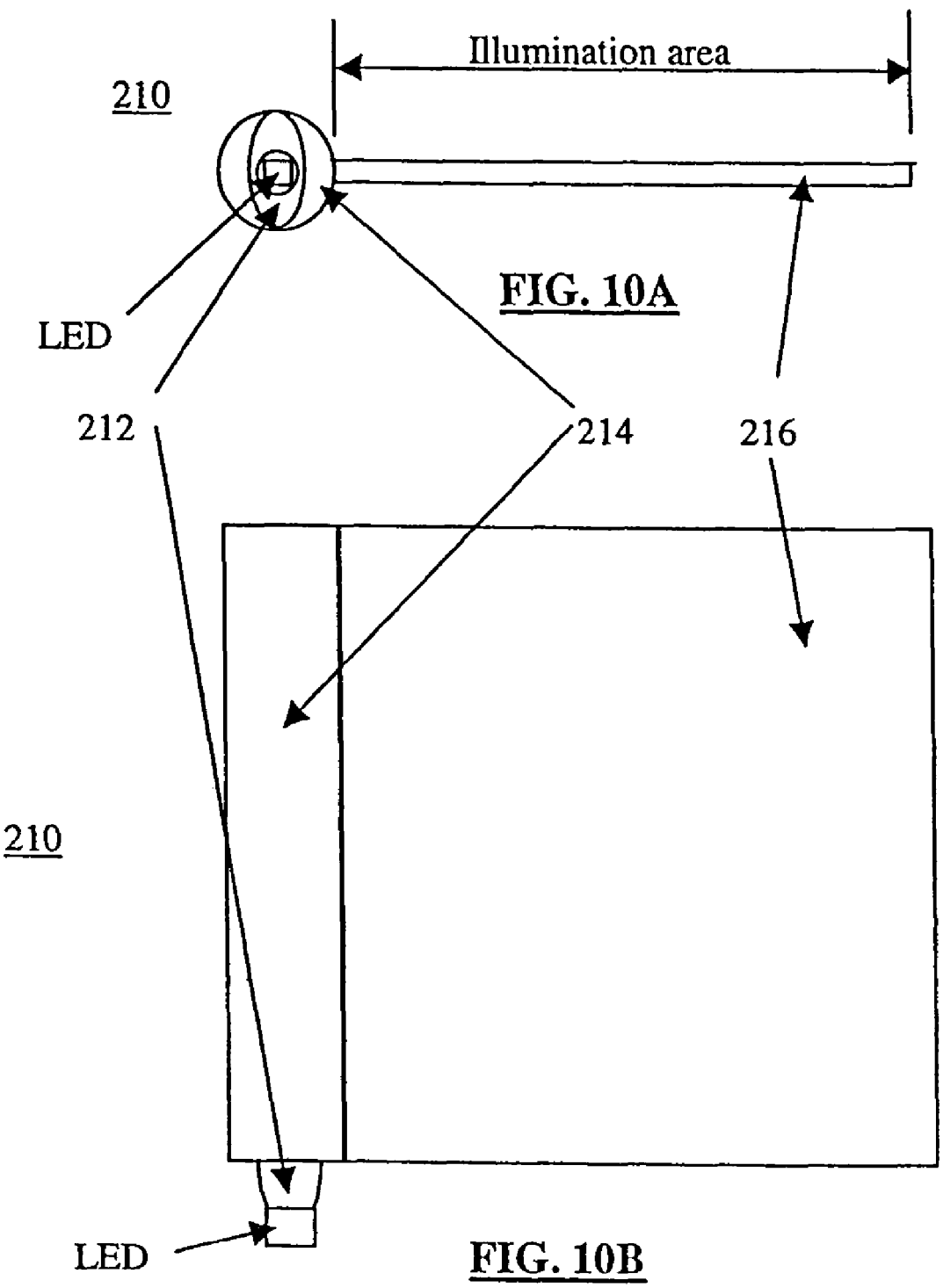

Glass Substrate

FIG. 13"

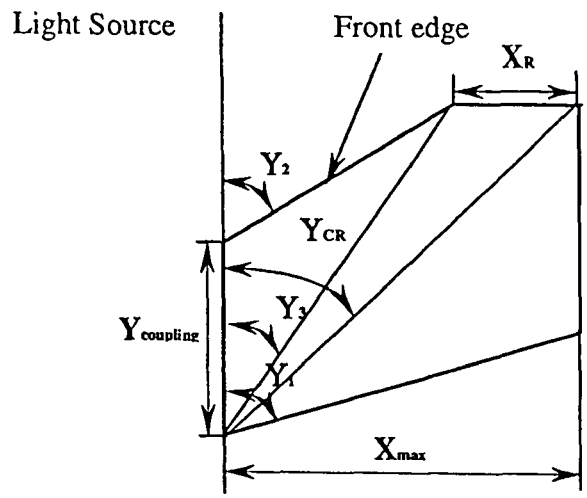
FIG. 14A
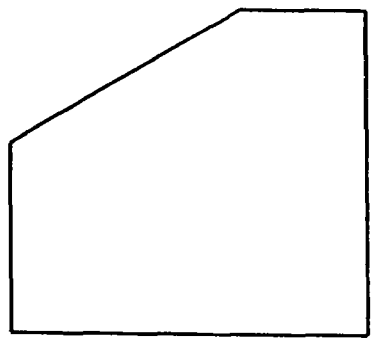
FIG. 14B
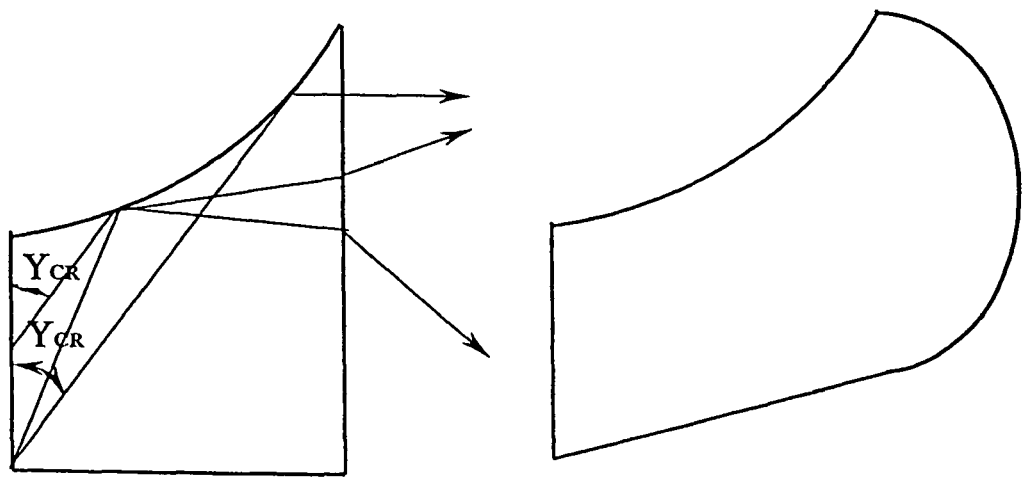
FIG. 14C
FIG. 14D

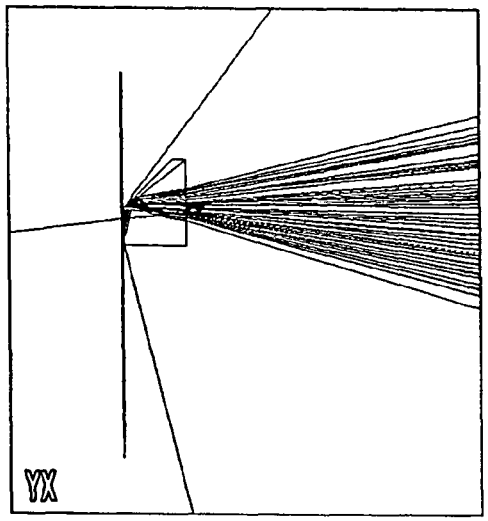 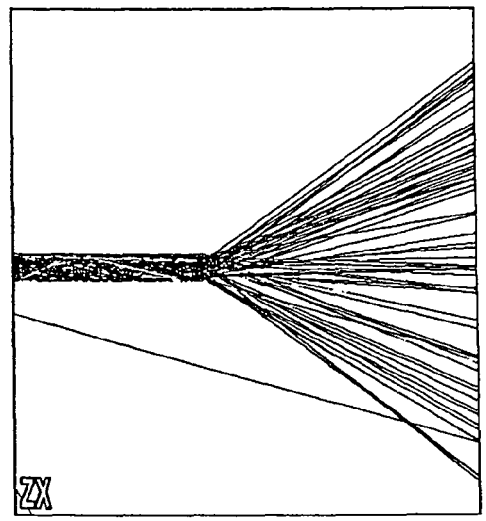
FIG. 15A　　　　　　　　　　　　FIG. 15B
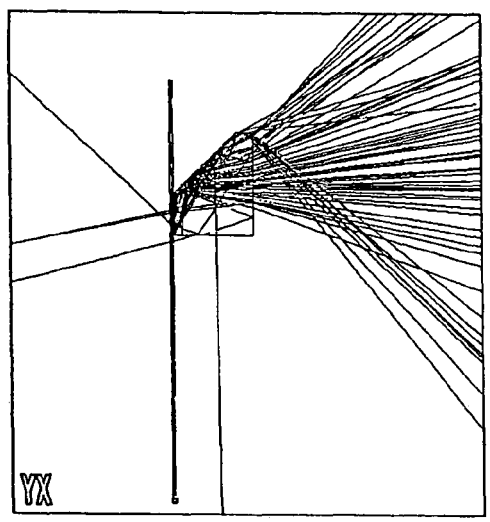 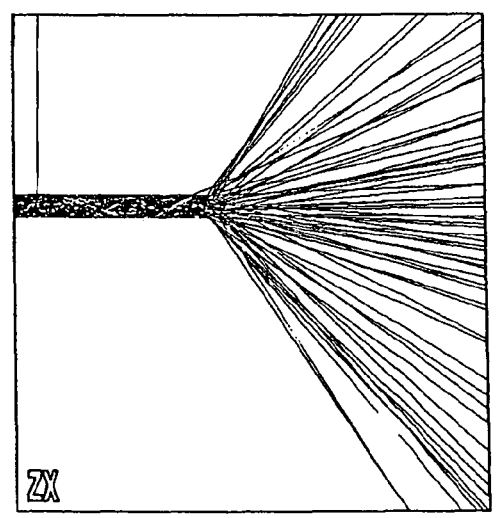
FIG. 15C　　　　　　　　　　　　FIG. 15D

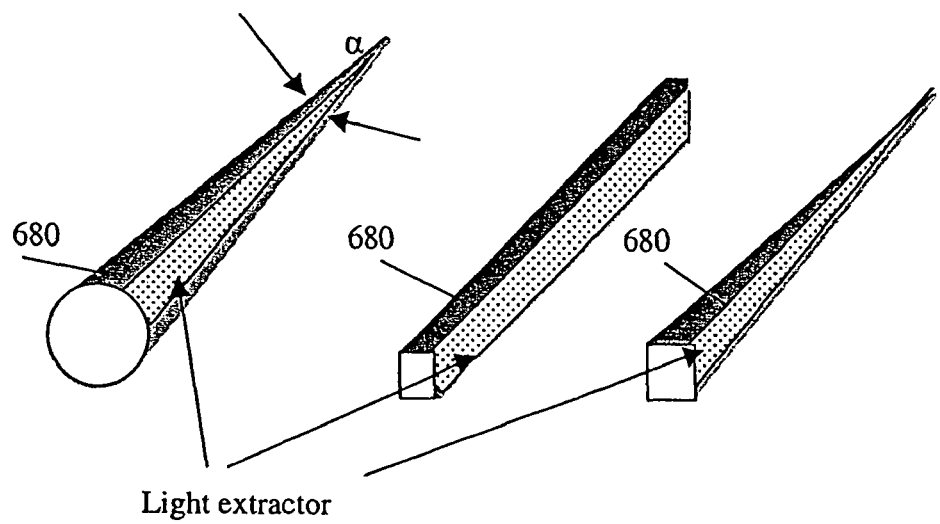
FIG. 23A    FIG. 23B    FIG. 23C
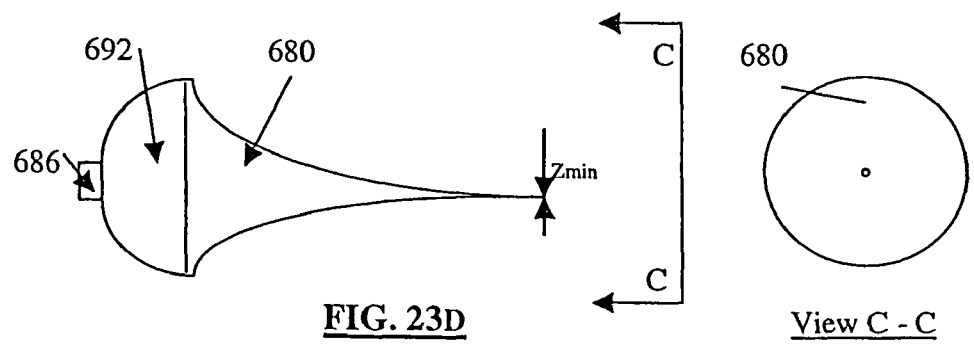
FIG. 23D    View C - C
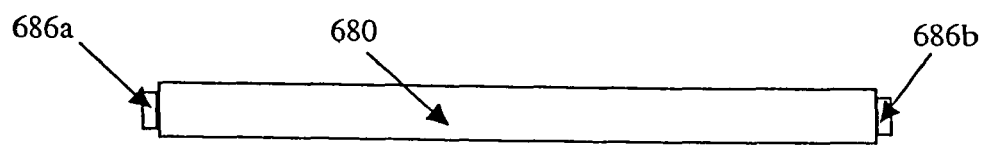
FIG. 23E

ULTRA THIN RADIATION MANAGEMENT AND DISTRIBUTION SYSTEMS WITH HYBRID OPTICAL WAVEGUIDE

CROSS-REFERENCE TO RELATED APPLICATIONS

This application is a divisional of application Ser. No. 10/191,372, filed on Jul. 2, 2002, now U.S. Pat. No. 7,263,268, and claims the benefit of U.S. Provisional Application No. 60/307,204, filed on Jul. 23, 2001, all of which are entirely incorporated herein by reference.

This application is also related to application Ser. No. 11/818,244 filed Jun. 14, 2007, which is also a divisional of application Ser. No. 10/191,372, filed on Jul. 2, 2002, and claims the benefit of U.S. Provisional Application No. 60/307,204, filed on Jul. 23, 2001.

FIELD OF THE INVENTION

The present invention relates in general to waveguides for flat panel display devices, and in particular, to thin, efficient and uniform hybrid optical waveguides of a generic compound class of systems with functionally distinct cooperatively acting optical entities.

BACKGROUND OF THE INVENTION

Various kinds of illuminators are known in the art for illuminating display panels, such as transmissive and reflective liquid crystal displays ("LCDs") as used in cellular phones, PDAs, electronic equipment, desktop and portable computers, as well as keyboards, and instrument panels to name but a few applications. The most recent type of these illuminators is of an "edge coupled" design, which ensures luminance uniformity over a display area with a relatively small device thickness. While luminance uniformity is important, device thickness is of crucial importance in flat panel displays ("FPDs") and the other aforementioned applications.

A front and side view of a prior art flat illumination devices ("FIDs") 10 as shown in FIG. 1A has one or more point-like or extended light sources 12a, 12b, 12c, 12d, 12e, 12f coupled to one or more edge faces 14a and 14b of a light guiding plate ("LGP") 16 with generally non-uniformly distributed light extraction means. Point-like light sources most typically include light emitting diodes ("LEDs") while typical extended light sources include cold cathode fluorescent lamps ("CCFLs"). Such prior art FIDs suffer from a number of well known drawbacks, namely poor brightness and color uniformity, especially when operating with LEDs, and low output efficiency. Because of these deficiencies, the number of lamps has to be increased, leading in turn to higher power consumption and device cost. The list of drawbacks would not be complete without mentioning the thickness of the device. For all the light emanating from the source to be injected efficiently into an LGP, its thickness should be equal or larger than the source size. This is in particular relevant for LEDs, as most of the flux not entered into an LGP will be lost.

In some applications, there is a further requirement for an additional collimation of the source radiation for a more effective subsequent extraction in an LGP. In this case, as is illustrated in FIG. 1B, an LED 18 is coupled to a collimating section 20 at an edge aperture 22 having an edge aperture width of "Z". Existing backlights for small aperture LCDs for cellular phones have a typical edge width "Z" of between 0.7-1.5 mm and suffer from coupling efficiency losses. Smaller values of Z are particularly beneficial for frontlights for reflective LCDs, since it allows one to achieve a smaller degradation of a displayed image, smaller parallax and less subjectively disturbing perceptual difference between the depth of frontlight and LCD planes. In other common applications, such as keyboards, dashboards and instrument lighting, FIDs frequently cannot be used at all since in addition to much smaller acceptable thickness they should be mechanically flexible to enable key operation and/or ultra compact packaging. As a result of this deficiency, multiple LEDs are used to directly illuminate localized display areas, resulting in high luminance non uniformity, low power efficiency, complicated mounting and elevated cost.

Regardless of the specific application, different types of LCDs have different requirements from an associated radiation management system, such as an LGP. Some of these are described in greater detail below.

Transmissive LCDs.

Portable and handheld communication and computing devices are a very attractive market for small and medium LCDs. The market is rapidly expanding, and these applications are a natural fit for LCDs because, among other advantages, they offer the thin profile necessary for creating small devices. However, there are a number of serious problems that must be addressed when using LCDs in these devices, most of which center around the backlight. For transmissive LCDs, the backlight saps much of the battery power because it must be very bright to shine through the strong absorption of the multilayered LCD. Color LCDs are particularly inefficient; efficiency losses due to the requisite polarizers, color filters, and "transparent" electrodes results in a final light transmission of only about 5%. Such low transmission makes the power consumption of color LCDs for most mobile applications prohibitively high. The battery would have to be enormous, or else the device would need new batteries far too frequently. Finally, there is the problem of poor view-ability in that the standard backlit transmissive LCD is nearly unreadable in sunlight. These issues can be addressed with varying results, in a number of ways including changing the method of light modulation and reducing the absorptive losses of the LCD components.

Reflective LCDs.

For reflective LCDs the backlight design also plays a pivotal role. Reflective LCDs can be made in two configurations: outer-surface reflective and inner-surface reflective. Outer-surface reflective devices are constructed similarly to transmissive devices, with the backlight replaced by a reflective surface behind the rear polarizer. While simple, this configuration has the disadvantage of poor contrast and color at a wide viewing angle, because the incident and reflected beams pass through different color filters (leading to both greater absorption of the light and color mixing). There can also be parallax problems associated with having the reflector behind both glass substrates. Outer-surface reflection is widely used in watch and calculator displays (and has been for more than 20 years) and may be acceptable for handheld devices, but the quality is too poor for sophisticated displays such as notebook computers.

A superior construction (although more difficult to fabricate) is the inner-surface reflective device, which incorporates the reflective layer into the bottom electrode. Because the reflection occurs much closer to the color-filter layer, the viewing-angle problems are greatly diminished.

The reflective LCD is a tremendous boon for some mobile devices because it eliminates the need for a backlight. However, reflective LCDs cannot, of course, be used in darkness, which is a requirement for some devices, such as cellular telephones and PDAs. Hence, a hybrid device has evolved, called the transflective LCD. In transflective LCDs, both transmissive and reflective modes are employed; the device has a backlight, but it also makes use of ambient light through reflection. Seiko-Epson Corp. has developed a transflective configuration, which it calls semi-transparent, and which replaces the reflective layer in an outer-surface reflective device with a semitransparent plate having a given reflectance—transmittance ratio, for example 0.7 and 0.3 (if zero absorption is assumed). The backlight partially shines through, and ambient light is partially reflected. Seiko Epson has demonstrated a 6.5-inch thin-film diode transflective LCD. With half-VGA pixel format, the display acts like a transmissive product when the backlight is on and like a reflective product when the backlight is off. Seiko-Epson has also developed a reflective film for the display that has a 10:1 contrast ratio and a 512-color capability; power consumption is reported to be 0.12 watt. Most of the low cost reflective LCDs for portable devices incorporate a similar design using a transflector. However, such a transflector reduces both an effective reflectance of the LCD in a passive mode and an observable luminance in backlit mode in a proportion equal to its reflectance-transmittance ratio.

It would be highly advantageous to remove a transflector and to use a ~100% reflectance reflector with a similar BRDF (bidirectional reflection distribution function) behind the backlight instead of a presently used white lambertian back reflector. Another apparent alternative is the use of a frontlighting scheme, whereby an illumination device is placed in front of the LCD. However, prior art frontlights employing microprismatic extractors have an inherently low luminous efficacy, large thickness, introduce image distortion and are expensive. In view of these disadvantages, their use has been limited.

Thus, there is a well recognized need for FIDs featuring drastically reduced thickness along with higher output luminous efficacy, greater degree of control over intensity distribution of the extracted radiation, better uniformity, better mechanical flexibility, ease of manufacturing and reduced cost. This need exists regardless of whether the FID is reflective, transmissive or transflective.

SUMMARY OF THE INVENTION

An object of the present invention concerns provision of ultra-thin backlights and front lights for LCDs with improved radiant efficacy which enable designers to achieve a more compact device and (in the case of frontlights) smaller degradation of a displayed image, smaller parallax and less subjectively disturbing perceptual difference between the depth of frontlight and LCD planes. It is to be understood however, that although the present invention is for applications related to FIDs it is in no way restricted to such. As will become apparent from the detailed description of embodiments, the instant invention can be advantageously used in a wide range of applications encompassing various lighting systems with a need for distributed light injection and ejection means, couplers, and multiplexers for optical communication networks and other devices for radiation transfer and distribution, in which radiation is transported by wave guiding devices.

The object of the present invention, termed a Hybrid Optical Waveguide ("HOW"), represents a generic compound class of systems with functionally distinct cooperatively acting optical entities. These include: (1) Principal Radiation Carrier (PRC); (2) an extended planar or wedge Waveguide Ejector with distributed flux extraction means referred to hereinafter as a Hybrid Optical Pipe Ejector (HOPE); (3) Distributed Optical Pipe Ejectors (DOPE) with directional flux ejection properties; and (4) Distributed Optical Pipe Injectors (DOPI). The HOPE, DOPE and DOPI are also referred to herein as Secondary Radiation Carriers (SRC).

Depending on geometry and coupling architecture of these entities HOWs can be configured to perform a variety of functions related to transfer, distributed injection, and distributed directional ejection of a radiant energy. Some combinations of PRCs and SRCs are described below:

1. PRC—Planar waveguide ejector referred to hereinafter as a Hybrid Optical Pipe Ejector (HOPE);
2. PRC—DOPEs providing distributed discontinuous (localized) quasi-lambertian or directional, flux ejection over the whole length of PRC;
3. PRC—DOPIs providing distributed flux injection over the whole length of PRC;
4. Doubly Hybrid PRC—DOPIs/DOPEs providing distributed flux injection and ejection over the whole length of PRC; and
5. Multiple active and passive PRCs-SRCs providing distributed flux injection and ejection through PRC aperatures.

It has been discovered, that as a fraction of a flux propagating along a PRC is coupled out through the slit-configured optical coupling it continues to propagate along a SRC by total internal reflection ("TIR"). In other words, an acceptance aperture of the SRC's coupling slit remains unity with respect to all the flux coupled out from the PRC. This is a most general phenomenon. It will become apparent from the detailed embodiments that it holds for any cross section of a PRC, for a wide range of SRC shapes and different PRC-SRC coupling architectures. Since the flux can be coupled from a PRC into a SRC along the whole length of a HOPE's slit coupling the small primary light source is transformed into an extended ultra thin, virtual linear source with a uniquely shaped spatially filtered radiant intensity distribution. Further, a transformed virtual source provides very good coverage (i.e., internal flux density) over large SRC's faces, so that a uniform or any required flux extraction can be accomplished for a considerably reduced (up to orders of magnitude) Aspect Ratio (X/Z, Y/Z), i.e., reduced thickness Z of the SRC. HOPE has a large number of unique properties. Thus, the longer a HOPE ($Y_{max}$) the thinner should be the slit coupling (SC) and hence SRC thickness ensuring a more uniform flux ejection into an SRC. In prior art FIDs of an edge coupled type the reverse is true: the thickness of their light guiding plate ("LGP") should be made larger for larger size (to maintain a constant AR) in order to obtain a more uniform light extraction. In addition a PRC can have a relatively large cross section enabling greater flux injection, while the SRC can be made appropriately thin and produce higher luminance through its extended ejection aperture (illumination window) with relatively high overall luminous efficacy. This makes it an ideal FID for back and front lighting of transmissive and, in particular, reflective LCDs.

PRC-HOPE is also an ideal compact flux mixer. If a triad of primary red-green-blue ("RGB") LEDs are used, PRC ensures an effective mixing of separate colors, so that a SRC accepts a White color with a given Correlated Color Temperature ("CCT"), or in fact any desired color within the color gamut of primary colors. Consequently, a need for less efficient and more expensive single "white" LED with a constant CCT and poor color rendering can be obviated. If two different LEDs (e.g., white LED or two color LED and a complimentary monochromatic LED of a suitable color) are coupled to the opposing injection apertures of PRC an adjustable white with better color rendering can be produced with a thinner PRC-SRC. These and other examples will be disclosed in the detailed embodiments.

To summarize, HOW based devices have following characteristics:

1. Ultra thin extended flux extracting element, which can be smaller by orders of magnitude compared to a source of radiation.
2. Higher luminance with a drastically reduced thickness.
3. Higher overall flux output efficiency.
4. Better uniformity of extracted flux over large planar areas, in particular for compact high intensity radiation sources.
5. Selective spatial modulation (transformation) of a radiant intensity distribution of a primary source allowing to obtain differently shaped distributions of the extracted flux. This transformation is accomplished by optical means which are considerably more compact compared to conventional optical devices.
6. A great variety of PRC-PSC optical coupling architectures enabling distributed and multiple localized SRC extractors with directional radiant intensity distributions.
7. Energy efficient coupling of the primary light source to the PRC resulting in an increased effective flux of the former (i.e. external quantum or luminous efficacy of the source).
8. Improved extraction efficiency (external quantum efficiency) of planar emitters with high refraction index, (i.e., LEDs).
9. Distributed flux injection—ejection enabling to couple a significantly higher flux into a light conduit and to eject it with smaller losses.
10. New planar architectures for coupling, relay and multiplexing in various optical communication devices.

These and other objects and advantages of the invention, as well as the details of an illustrative embodiment, will be more fully understood from the following specification and drawings.

BRIEF DESCRIPTION OF THE FIGURES

FIG. 10A shows a side view of HOW-HOPE backlights with an asymmetric foconic coupling section of elliptic, truncated pyramid, in accordance with the instant invention;

FIG. 10B illustrates a top view of the HOW-HOPE system of FIG. 10A with a PRC having an asymmetric foconic coupling section, in accordance with the instant invention;

FIGS. 14A through 14F illustrate various shapes of directional DOPE elements, all in accordance with the instant invention;

FIGS. 15A and 15B show ray traced trajectory of a flux ejected through the DOPE in azimuthal and elevation projections;

FIGS. 15C and 15D show ray traced trajectory of a flux ejected through the DOPE in azimuthal and elevation projections;

FIGS. 23A through 23D illustrate linear and nonlinear wedge shaped PRC with circular and other cross sectional shapes and optional additional light extracting elements, all in accordance with the instant invention;

FIG. 23E illustrates a PRC with two light sources coupled to its front and back injection ports, in accordance with the instant invention;

DETAILED DESCRIPTION OF THE INVENTION

Figure 1A:
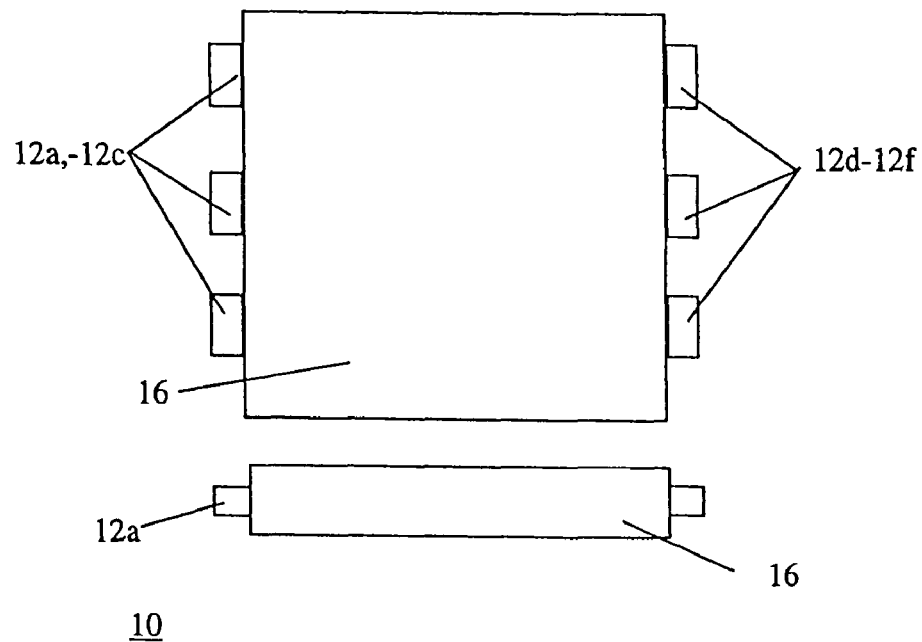
FIG. 1A shows a prior art backlight illuminator with six LEDs coupled to two edges of a rectangular flat LGP.

While the specification concludes with claims defining the features of the invention that are regarded as novel, it is believed that the invention will be better understood from a consideration of the following description in conjunction with the drawing figures, in which like reference numerals are carried forward.

Figure 2A:
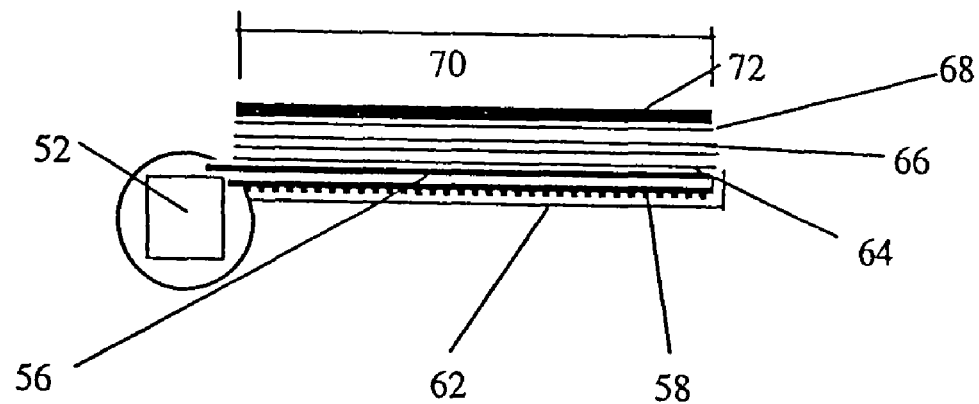
FIG. 2A illustrates a schematic view of a preferred embodiment of a HOW-HOPE FID backlight according to the present invention.
Figure 2B:
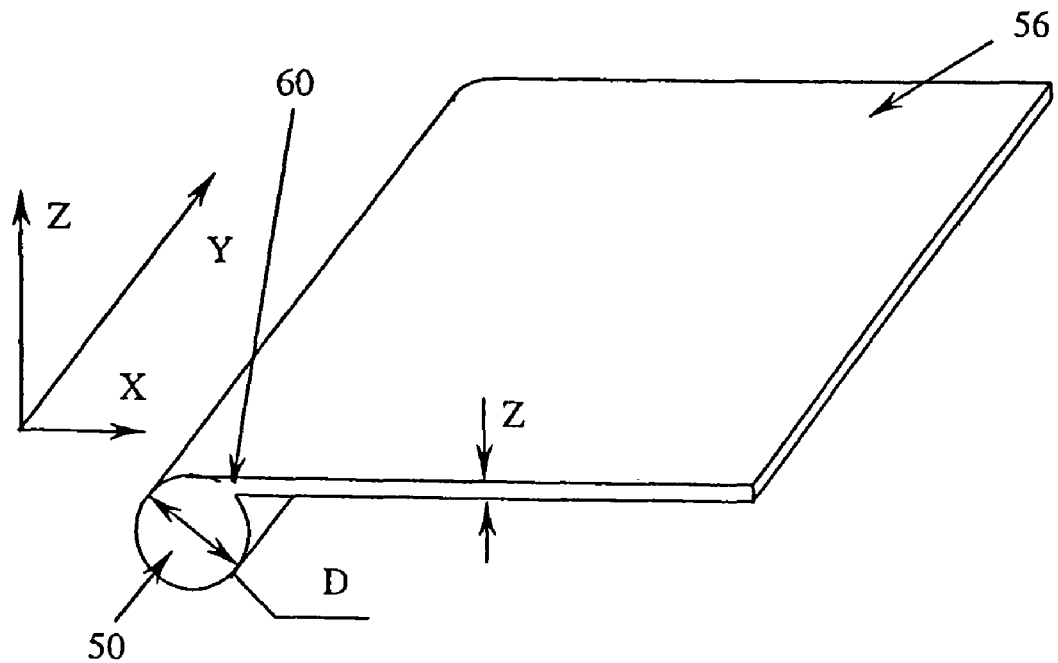
FIG. 2B illustrates a second view of the HOW-HOPE of FIG. 2A.
Figure 2C:
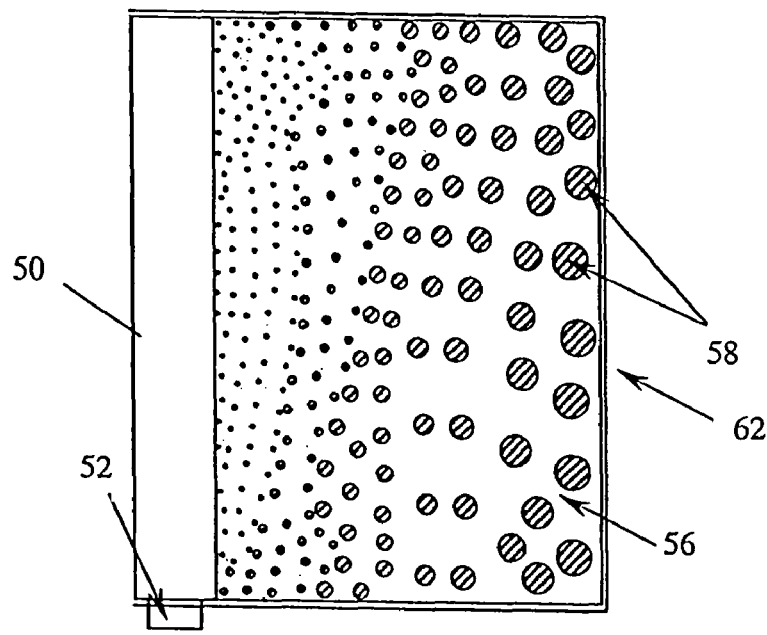
FIG. 2C illustrates a view of the LGP of FIG. 2A with nonuniformly distributed flux extractors.

Referring now to FIGS. 2A-2H there is illustrated therein various views of an exemplary HOW-HOPE embodiment in accordance with the present invention. Reference is made in particular to FIGS. 2A-2C, wherein FIG. 2A illustrates a schematic view of a HOW-HOPE flat information display, and FIGS. 2B and 2C illustrate views of the hybrid optical waveguide used in connection with that embodiment. In particular, the embodiment of FIGS. 2A-2C include a principle radiation carrier ("PRC") 50 having a circular cross section and optical axis in Y direction, with at least one light emitting device, for example a single LED 52, disposed at the injection aperture of PRC so that all or part of its flux is coupled into the PRC and propagates along Y by total internal reflection ("TIR"). The embodiment of FIGS. 2A-2C further include a secondary radiation carrier ("SRC") in the configuration of a planar Light Guiding Plate ("LGP") 56 with distributed flux extractors 58 being disposed on at least one face of an LGP, and used to extract the light through at least one face of the LGP. The LGP and distributed flux extractors are described in greater detail in commonly assigned, co-pending U.S. patent application Ser. No. 10/145,178, entitled "ULTRA-THIN BACKLIGHT" to Ben-Zion Inditsky and filed May 15, 2002, the disclosure of which is incorporated herein by reference.

The embodiments of FIGS. 2A-2C further illustrate a PRC and SRC having a slit shaped optical coupling (physical contact) 60 along a longitudinal (axial—Y) direction of the PRC 50. Optionally mirror or lambertian reflection means 62 may be disposed behind part or all the faces of the LGP except the illumination area. As an additional optional element, one or more light influencing films such as a diffuser 64, brightness enhancing film 66 ("BEF") or DBEF 68 may be positioned in front of the illumination area 70 for brightness enhancement of the extracted light for the display 72. As noted above all of these elements are described in the incorporated disclosure of the '178 application.

The basic shape of the LGP 56 shown in FIG. 2B, is a flat thin plate, which is tangent to a cylindrical or rod shaped PRC 50 and may constitute one monolithic integral part, or alternatively two or more parts that are bonded together to assure a physical contact. The PRC and SRC are made of dielectric transparent materials, such as glass or plastic material with a refractive index of 1.3<n<2.2 (typically about 1.5). It should be noted that although the LGP shape depicted in FIG. 2B is one preferred one, other PRC and SRC shapes with other coupling positions are also possible. For example, depicted in FIGS. 2D and 2E in side and perspective views is an embodiment wherein the PRC 74 has a rectangular cross section, and the SRC 76 is coupled at a mid-point in the rectangle. It should also be noted that in the embodiment of FIGS. 2D and 2E the single point light source (e.g., LED 52 of FIG. 2A) is replaced by a plurality of lights sources, specifically colored light sources 78,80 and 82 which may be respectively red, green and blue light sources.

Figure 2D:
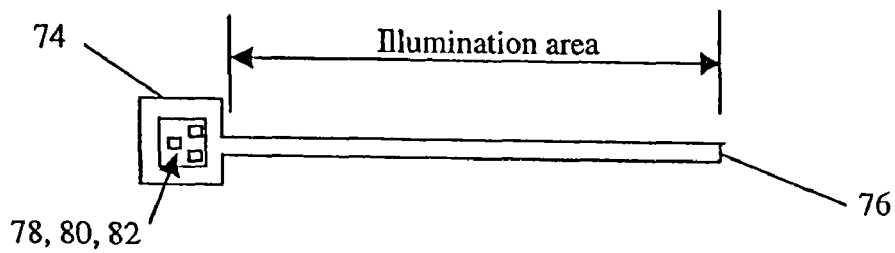
FIG. 2D illustrates a side view of another embodiment of a backlight in accordance with the instant invention.
Figure 2E:
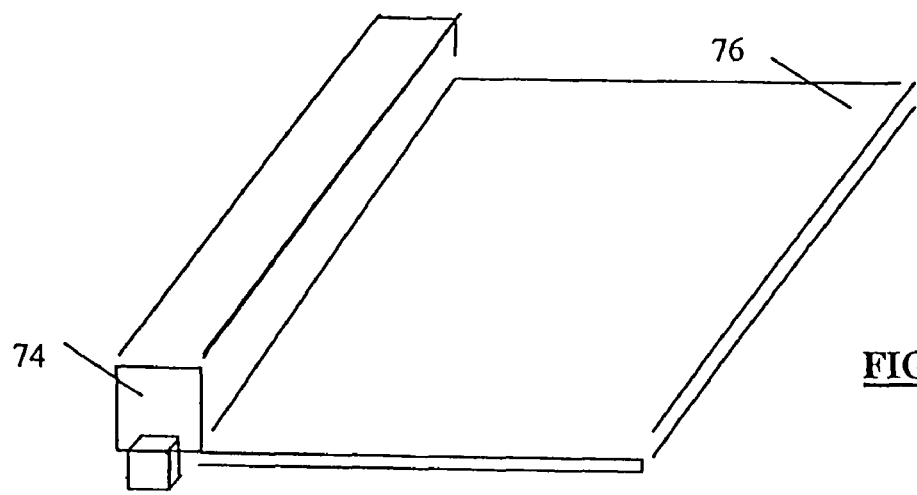
FIG. 2E illustrates a perspective view of the LGP of FIG. 2D.
Figure 2F:
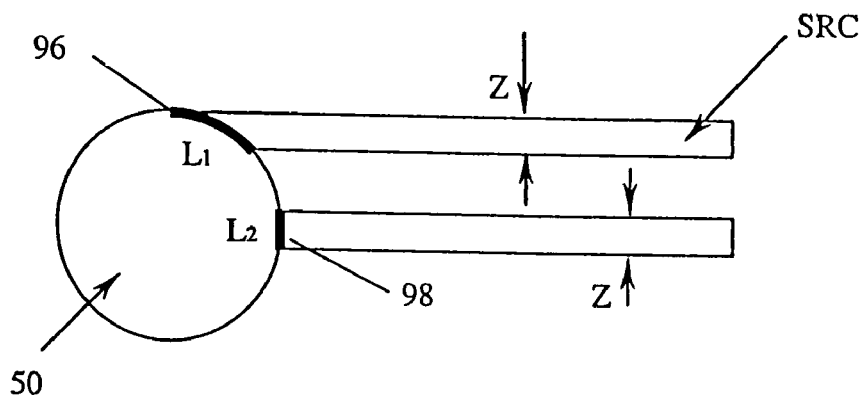
FIG. 2F illustrates the intersection length of two intersection positions of the flat section and the cylindrical section.
Figure 2G:
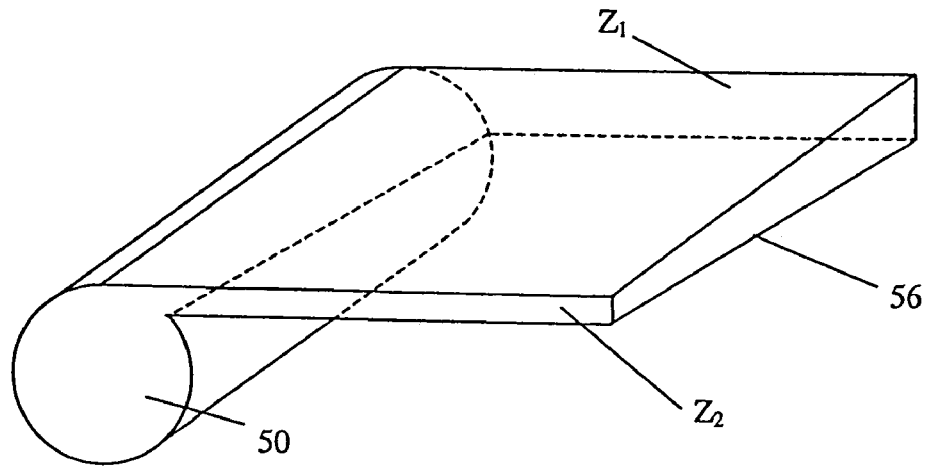
FIG. 2G illustrates a LGP with a variable width of a PRC-SRC coupling slit, in accordance with the instant invention.
Figure 2H:
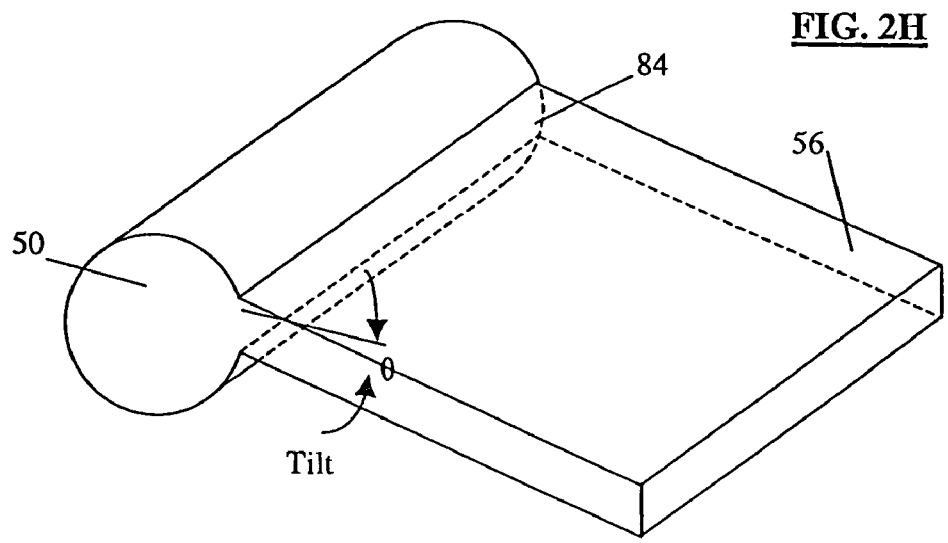
FIG. 2H illustrates a HOW-HOPE system with a tilted SRC, in accordance with the instant invention.

Generally, a SRC can be coupled to a PRC along a section 84 defined as $Y_c$ of any length, at any tilt within +/−90 DEG. to its X-Y plane, as depicted in FIG. 2H, and at any section on its circumference. Thus, SRC is a very flexible light-extracting device. For a most general case of a lambertian primary emitter the rays escaping from PRC into SRC are already constricted in PRC within a cone with an apex angle $SIN(A_{in})=1/N_{in}$ (for example 41.8 deg. for N=1.5). A flux so constricted is coupled out into the SRC, and continues to propagate along the latter by TIR without any coupling losses or leakage. Stated more generally, an acceptance aperture of SRC always is equal or larger than the ejection aperture of a PRC, i.e., a numerical aperture ("NA") of SRC is equal or larger than NA of the PRC.

It is to be noted that the PRC can be formed in virtually any shape. FIGS. 2A and 2B for example illustrate an embodiment in which the PRC is generally cylindrical in shape, while, e.g., FIGS. 2D and 2E illustrate a generally rectangular shaped PRC. While these are two embodiments, it is to be understood that almost any other shape can be employed such as a semi-cylindrical shape, or a totally irregular shape. The PRC may also be essentially hollow with a via formed through a central area and light sources coupled to its outer section.

To summarize the elements of a Hybrid Optical Pipe Ejector (HOPE), depicted in FIG. 2, it includes two distinct optically coupled wave guides: (1) An elongated rod-like cylindrical wave guide with a light source coupled to its input aperture (the PRC); and (2) a Secondary Radiation Carrier (SRC), which is substantially thinner (smaller Z) and substantially larger in width (larger X) dimensions, than the corresponding dimensions of the PRC's cross section. The horizontal active light emitting faces of a SRC (Y-Z plane) can also have any arbitrary shape with maximal $Y_{max}$ being smaller or larger than the length $Y_{max}$ of the PRC. The active flux emitting faces of an SRC may have distributed extracting means accomplishing an ejection of the flux internally propagating inside a SRC into its illumination window. The PRC and SRC can have the same or different refraction index N. The $N_{prc}$ to $N_{src}$ ratio modifies the rate and/or spatial parameters of a radiation transfer between two wave guides. The SRC is optically coupled to the PRC along the PRC's longitudinal axis (Y). The coupling length $Y_c$ can be smaller or equal to the length of the PRC, such that $$Y_{max,prc} \geq Y_c;$$

this coupling forming a slit of constant or variable Z, spanning one or more faces of an SRC.

The HOPE can be produced as a monolithic (monofilament) molded element or by bonding of PRC and SRC. PRC has a sufficiently large acceptance aperture to transfer all coupled radiation by TIR along its axis and can have a cross section of an arbitrary form including a hollow one. The only limitation is that the initial cross sectional shape of the injection aperture should not contract (shrink) along Y in order to prevent any uncontrolled flux ejection from the PRC. It may expand, or cyclically expand and contract to the dimensions that are not smaller in X, Z than the input aperture.

The radiation source can by of any type, such as a commercially available monochrome, white, infrared, UV or triad RGB LEDs, incandescent, HID, CCFL, HCCL, and others lamps. Single or multiple sources can include refractive and/or reflective collection means to concentrate the flux onto the input aperture. It can be coupled to an PRC directly or by means of a specially shaped energy conserving coupling section as described hereinbelow. A light source can also represent a remote source ("Light Engine") with a light conduit system (e.g., a fiber optic cable) whose exit aperture is coupled to the injection aperture of the PRC.

Figure 3A:
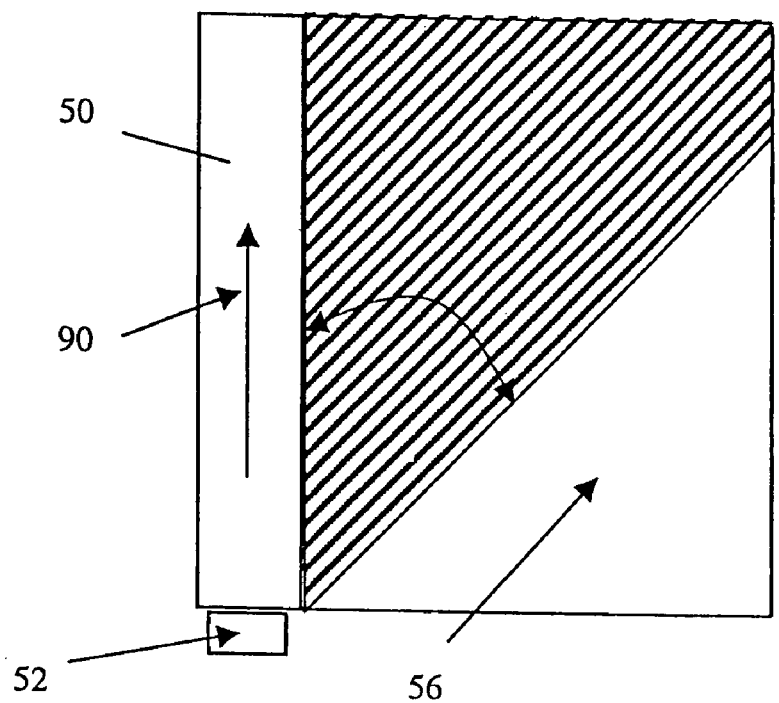
FIG. 3A illustrates forward flux paths within a HOW-HOPE system, in accordance with the instant inventions.

Referring now to FIG. 3A, there is illustrated therein the path light rays take when leaving from the PRC (50 of FIG. 2) into the SRC 56. Initially, the light rays propagate from the light source 52 in the direction of arrow 90. The thickness Z (from FIG. 2B) of the LGP 56 should be designed according to those specific dimensions to achieve a high illumination efficiency as explained below. A probability PC of a photon to enter from PRC into a SRC depends (for small values of Z relative to the diameter D of the PRC) on the ratio of the coupling width Z to the total perimeter of the PRC. For example for a PRC with a circular cross section it is simply:

$$P_c = \alpha_c / 2\pi.$$

The amount of the light flux propagating inside the PRC is quasi exponentially attenuated with an increasing Y, as it is gradually coupled into the SRC:

$$F(Y) = F0 * EXP(-P_c * F(N,Y) * Y)$$

Where:
F0 is the amount of light flux entering the PRC;
$P_c$ is a probability of photon coupling from PRC into SRC;
F(N) is a function of a refraction index N and PRC's cross sectional shape describing flux density distribution inside the PRC (i.e. the mode energy); and
Y is the distance along the coupling slit.

The residual flux inside the PRC reaching its exit aperture is:

$$F(Y_{max,prc}) = F0 * EXP(-P_c * F(N,(Y_{max,prc} * Y_{max}))$$

Where:
$Y_{max,prc}$ is the PRC's total length. This residual flux may be reflected back into the PRC by a coated or external mirror or lambertian reflector 92 of FIG. 3B, disposed proximate to the PRC's end aperture so that redirected residual flux continues to propagate in a backward direction along the PRC defined by arrow 94, towards its injection aperture. On this backward way, the light flux is coupled into the SRC at a similar rate, so that the amount of a residual flux incident on the source is:

$$F_{residual,source} = F(Y_{max,prc}) * F(Y_{max,prc} c)$$

For some light sources, such as LEDs, most of this residual flux will be eventually absorbed, so that only a small part is reflected back into the PRC. For other sources like fluorescent lamps, some of this flux will be reflected back into PRC. Note that for any fixed value of $F_{residual}$ a longer (Y) HOPE device should use a thinner SRC. In other words, the larger is an illumination area, the smaller is an optimal design thickness of the SRC. As mentioned above, it is common knowledge that the reverse is true for conventional systems, suffering from an elevated thickness for larger active areas.

The light rays entering the SRC are spread within an azimuthal angle β from the PRC's axis, in the propagation direction of the light rays. The angle β is given by the relationship β=ARCSIN (1/N)≈42 degrees for a typical material with a refraction index N=1.5. The second (elevation) polar angle α of the escaping rays is also within +−42 degrees. Thus an initially injected flux from a symmetrical source with an emittance cone of $\beta=+/-\beta_c$ is transformed into an assymetric quasi linear source with a one sided emission lobe. As we shall see this fundamental property of a HOPE systems can be extremely useful and enables construction of SRC ejectors with selective spatially filtered flux output. Such ejectors can have large intensity amplification in desired directions (e.g., more concentrated radiant intensity distribution) and enable to produce considerable power savings in a variety of systems by flashing only into a narrow spatial domain specified for a particular application.

Figure 3B:
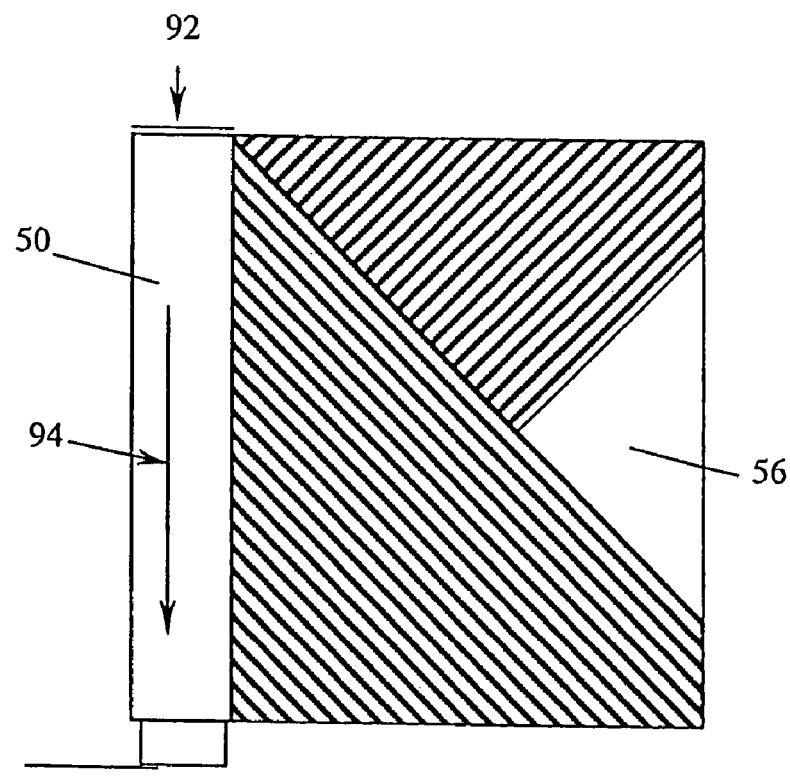
FIG. 3B illustrates flux paths in a forward and backward direction within a HOW-HOPE system with a second aperture of the PRC covered by a reflecting means, all in accordance with the instant invention.
Figure 6A:
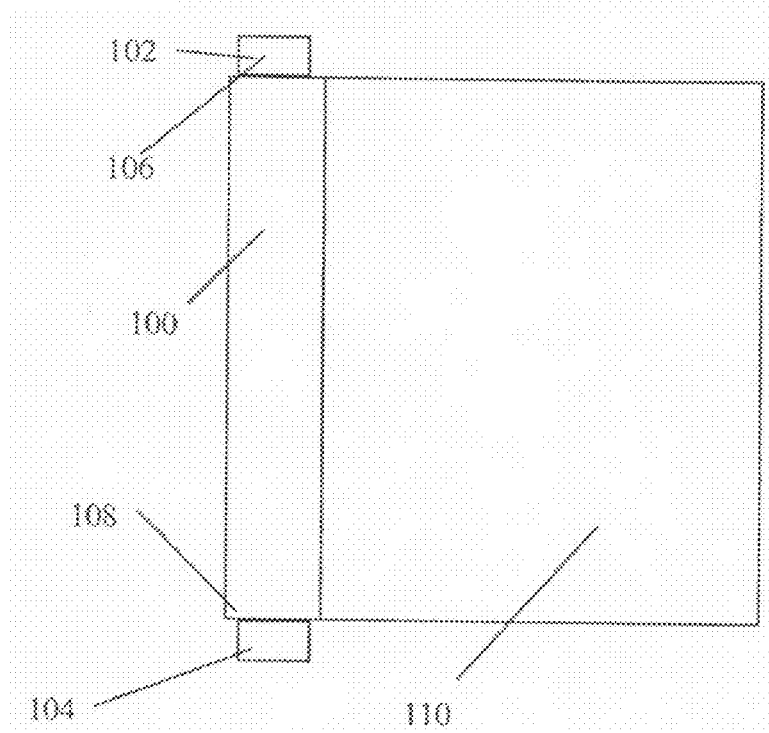
FIG. 6A illustrates a HOW-HOPE system with sources of radiation coupled to the front and end aperture of a PRC, in accordance with the instant invention.

It is desirable that the light flux entering into the SRC (LGP) should reach most of an area of its light emitting face to enable a more easier way to ensure a uniform flux extraction over the entire illumination area. As shown in FIG. 3B, since the first pass (arrow 90) and residual (arrow 94) fluxes inside the PRC propagate in mutually opposing directions, the flux coupled into a SRC is spread more uniformly over the entire illumination area (as illustrated by the dark lines in FIGS. 3A and 3B, as will be explained later. It should be noted that most LCDs have an aspect X:Y ratio of 3:4. Such configuration allows an almost complete coverage of the active SRC's face, since it subtends an azimuthal angle of 36.9 degrees, as depicted by the dotted lines. Yet more uniform internal flux density is obtained if two sources are coupled to the opposite (i.e., both) PRC apertures, as depicted in FIG. 6A below.

Figure 4A:
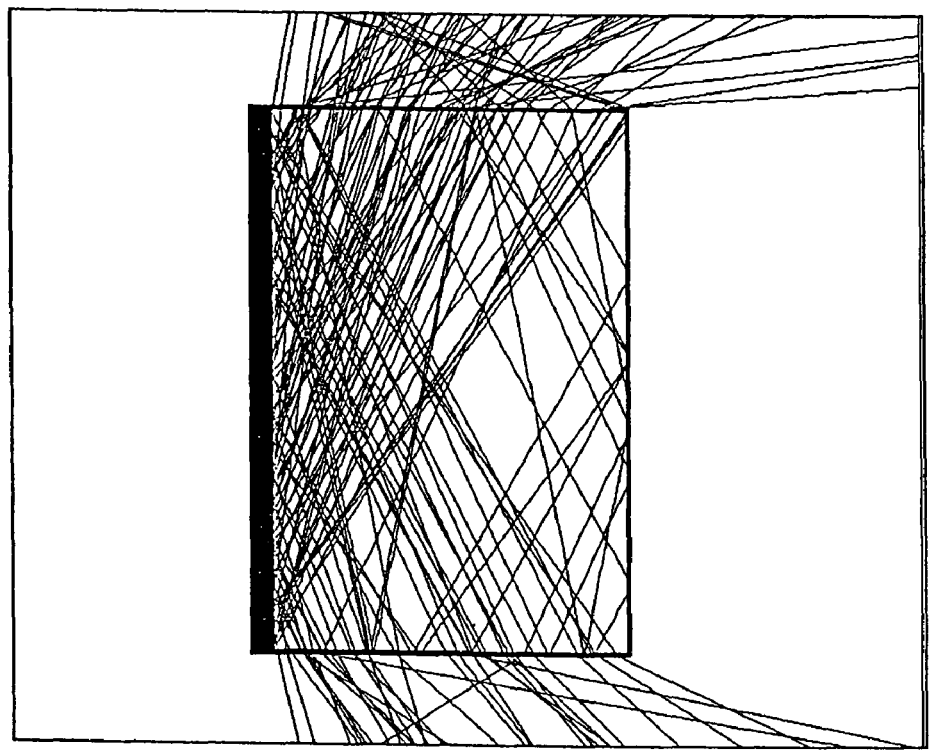
FIG. 4A is actual light ray trace trajectories for a HOW-HOPE system with no reflectors on SRC's lateral edges.
Figure 4B:
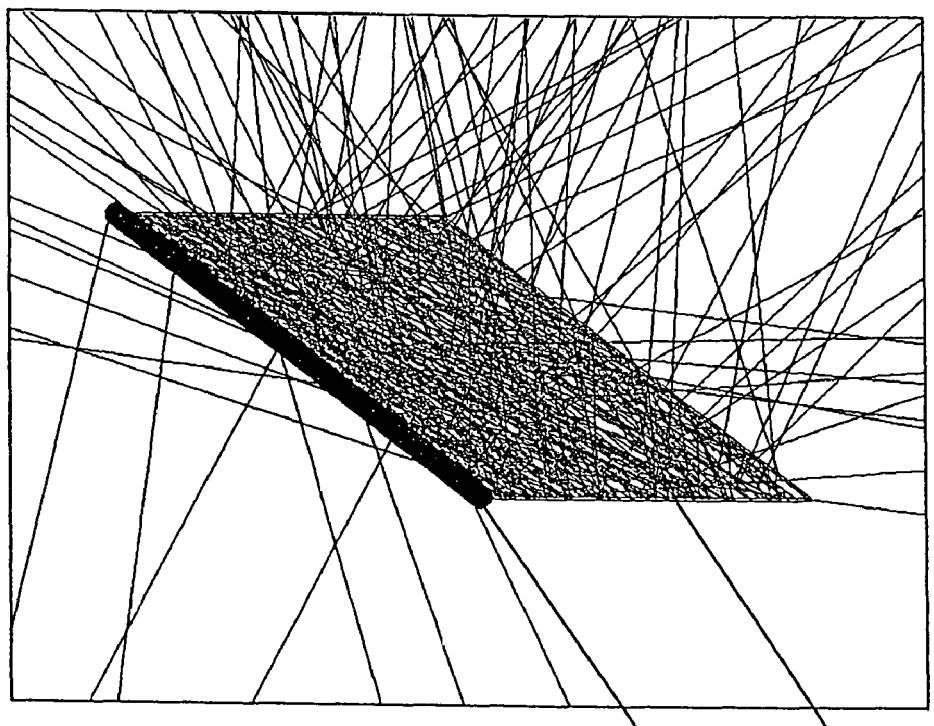
FIG. 4B is actual light ray trace trajectories for a HOW-HOPE system with reflectors on SRC's lateral edges.

Referring now to FIG. 4A there is depicted therein the trajectory of the light rays in an SRC without reflectors at its edge faces. All the photons (rays) are coupled out through the front and back side edges or faces of the SRC without any uncontrolled leakage through the active horizontal faces. Some of the photons undergo Fresnel reflection on the SRC edges and continue to propagate inside the SRC and/or PRC in a reverse direction until they are eventually coupled out through the edges. Note that no flux is coupled out through PRC and the edge C of SRC. Conversely, FIG. 4B is a view of the light ray trajectory in an SRC with distributed light extractors over its active face and preferably specular reflector means at its edge faces and behind its back face. As can be appreciated, substantially all the flux is extracted into a useful illumination window above the HOPE. Very few rays escape through the PRC outside the illumination window. This relatively low "stray" flux is due to scattering introduced by SRC's light extractors. By optimizing the extractor means, i.e., using forward scattering or TIR extractors and using e.g., specular edge reflectors, these losses can be reduced to very low levels. One can conclude, that for most HOPE devices PRC does not require any external reflector over its cylindrical section. This is an important novel property of HOPE devices bringing practical benefits of reduced size and cost.

It should be noted that one should consider a trade off between an overall radiant output efficiency and uniformity of extracted light when determining an optimal width Z of the SRC. A smaller value of Z, which might be desirable for many applications, such as LCD backlighting improves uniformity but can reduce efficiency. A larger value of Z can result in a higher efficiency but makes it more difficult to obtain desired luminance uniformity over SRC. An optimal value of Z can be selected within any range of values $0<Z<Z_{PRC}$ depending on aforementioned considerations for a particular device. As stated above the minimal diameter of a PRC is determined by the source configuration.

A coupling slit between PRC and SRC can have a constant width $Z_c$, as shown hereinabove with respect to FIG. 2B. Width however can decrease or increase along Y in a linear or non linear manner, as shown in FIG. 2G. More particularly, the width of the SRC 56 is of a first value Z1 along the proximate edge of the SRC, and of a second value Z2 at the distal edge. In this case a configuration of SRC transforms from a planar LGP to a linear or non linear wedge, which can have additional effective light extraction properties acting cooperatively with SRC flux extractor means as described in the commonly assigned, co-pending '178 patent application. Z1, Z2 and the coupling slit width can vary independently according to two respective specified functions along Y, forming a two dimensional asymmetrical wedge, which represents an extension of an aspherical, asymmetrical edge lens, likewise described in the '178 application. As mentioned above, an SRC of a given width Z can be coupled to the PRC at any section of its perimeter such as shown, for example, in FIG. 2D and FIG. 2E. However, in an embodiment as shown in FIG. 2F, the SRC is coupled to an uppermost 96 and middle 98 portion of a PRC having a circular cross section of the PRC. Since the PRC's coupling perimeter $L_1>L_2$, the former coupling increases the flux injection probability for a given thickness Z of the SRC, and, consequently, thinner SRCs can be used in this configuration for a same amount of a flux coupled into the SRC. Such coupling can also enable better packaging of the device in miniature systems, like mobile phones.

Figure 5:
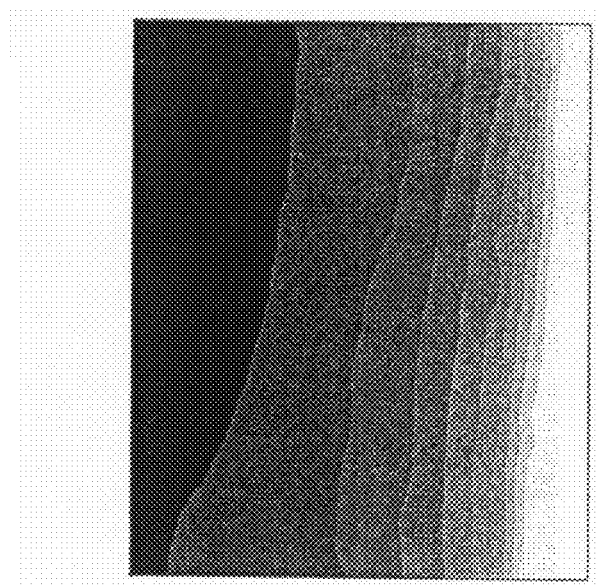
FIG. 5 illustrates a two-dimensional extractor density distribution over a SRC's face ensuring a uniformity of an extracted flux, in accordance with the instant invention.

As mentioned above with reference to FIG. 2G, the SRC can also be formed with a wedge-like shape coupling to the PRC. The extractor distribution over the respective face of the LGP, shown in FIG. 5 for the embodiment depicted in FIG. 2a, is generally non-uniform along both dimensions, having a low Cover Factor (CF) over areas with high internal flux, and high CF over area with low internal flux. The inventor has discovered that such pattern is principally different from those ones used for extractors of conventional FIDs. The distribution of the extractors on the face of the LGP is computed in a special iterative procedure to produce uniform illumination over the entire illumination area. A complete discussion of the extractors and the formation thereof is provided in the above mentioned '178 application incorporated herein by reference.

Figure 6B:
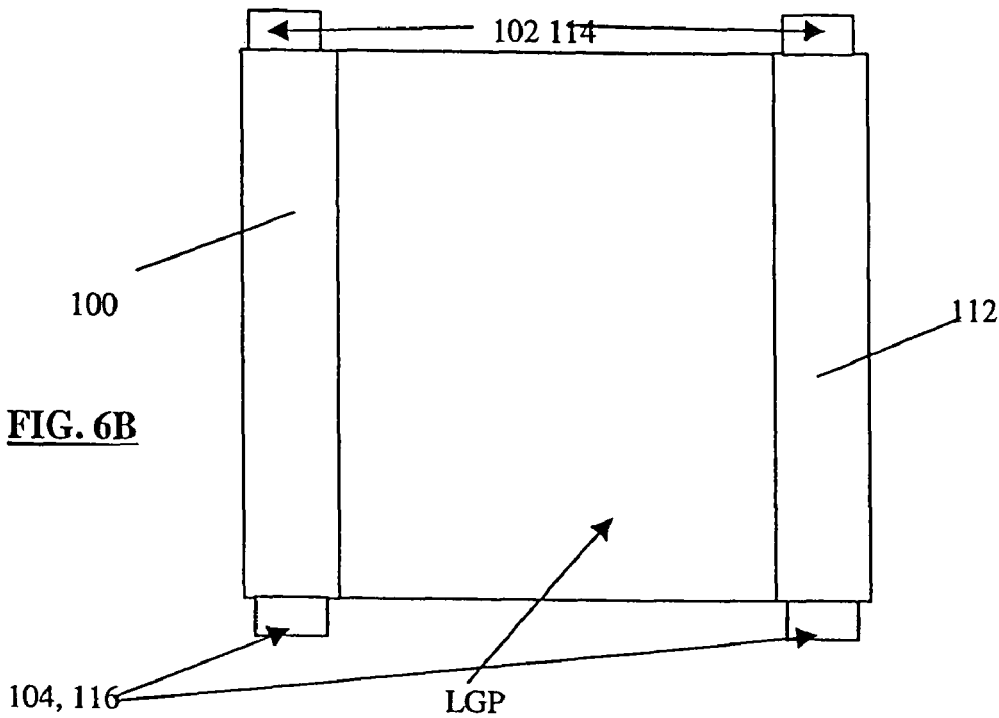
FIG. 6B illustrates a HOW-HOPE system with sources of radiation coupled to the front and end aperture of two PRCs, in accordance with the instant invention.

It may therefore be appreciated that 2, 3 or 4 PRCs each with one or more individual lamps or light sources may be coupled to some or all edges of a single SRC in order to achieve a higher display luminance illumination area. Similarly, and as is illustrated in FIGS. 6A and 6B, more than one light source can be coupled to a single PRC. More particularly, FIG. 6A illustrates an embodiment of a hybrid optical waveguide, with hybrid optical pipe ejector having light sources coupled to the front and end apertures of the PRC. Specifically, the PRC 100 may be a generally cylindrical or rod-shaped carrier as described above, wherein first and second light sources, e.g., LEDs 102 and 104 are coupled to first 106 and second 108 ends of the PRC. The SRC/LGP 110 is coupled along an edge of the PRC as described above.

In yet another embodiment of the invention, FIG. 6B illustrates a configuration of a hybrid optical waveguide, with hybrid optical pipe ejector having two PRCs 100 and 112, wherein each employs two light sources 102, 104 and 114, 116 respectively, coupled to their respective front and end apertures. Alternatively, a hybrid optical waveguide with PRC coupled to a remote high power "light engine" having for example a high intensity discharge lamp. An SRC HOPE with distributed flux extractors is coupled to the PRC and forms an ultra thin extended large area secondary light source having a specified luminance distribution. A large number of such SRCs can be coupled to the PRC to form multiple discontinuous secondary light sources along the whole length of the PRC. This configuration represents a particular example of HOW-DOPE optical devices.

Figures 7A, 7B:
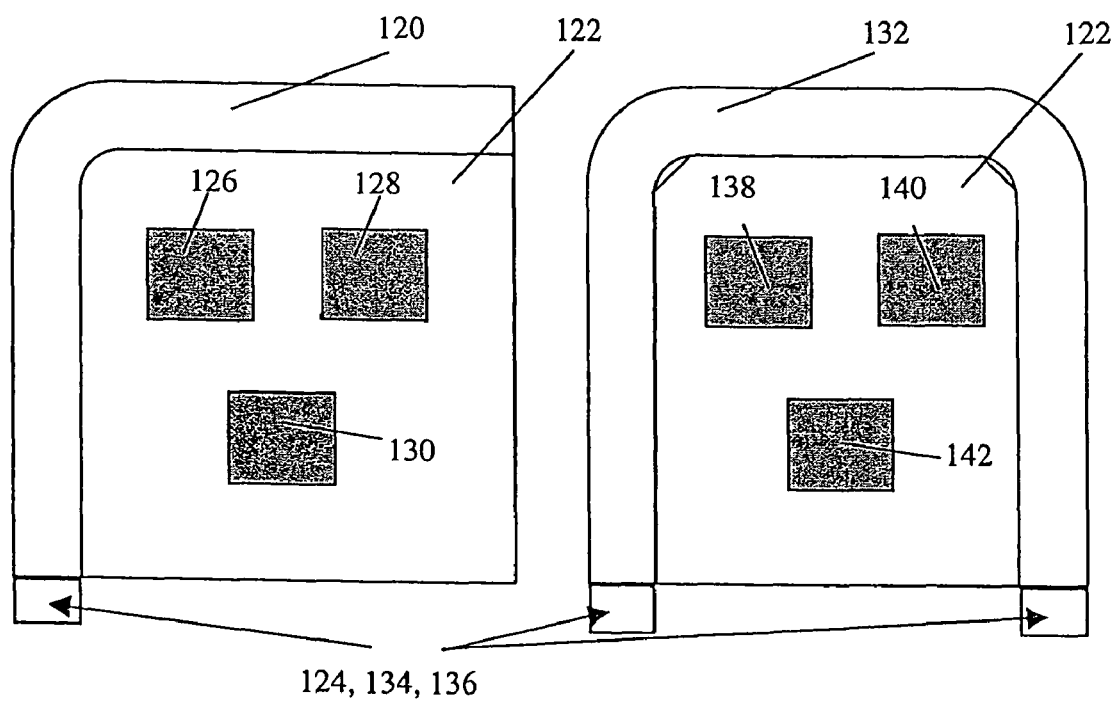
FIG. 7A illustrates a HOW-HOPE system with an L-shaped PRC, and a SRC having localized discontinuous flux extractors, in accordance with the instant invention.
FIG. 7B illustrates a HOW-HOPE system with an U-shaped PRC, and a SRC having localized discontinuous flux extractors, in accordance with the instant invention.

Referring now to FIGS. 7A and 7B, there is illustrated therein the concept of using a singe HOPE with PRC and SRC shaped in various L, U, elliptic, rectangular etc. forms. More particularly, FIG. 7A illustrates a HOW-HOPE configuration in which an "L" shaped PRC 120 is coupled to an SRC 122, and has but a single light source, e.g., LED 124 coupled at one aperture thereof. As noted above, a light source could be coupled at both ends as well. As illustrated, additional light extractors 126, 128 and 130 may also be disposed in the SRC. Similarly, FIG. 7B illustrates a "U" shaped PRC 132 coupled to a SRC 122 having light sources 134 and 136 coupled at either end, and additional light extractors 138, 140 and 142 disposed on the SRC. The distribution of the extractors could also be made discontinues in order to illuminate only selected portions of the illumination area, for example for use as a dashboard, or keyboard to name but a few examples. The CF of the extractors should generally have different values within each localized flux extracting area. For relatively large areas, it should also follow a suitable density distribution to ensure a required luminance or extracted flux density. Such CF distribution are determined by special iterative methods described in greater detail in the co-pending '178 application incorporated herein be reference.

As has been already mentioned above, the light rays emitted from a single extended source or from multiple discrete sources coupled to a PRC are subjected to an effective mixing as the fill the waveguide modes along its length. Stated differently a flux density of multiple virtual sources formed within the PRC represents a mean value of the source emittance averaged over the whole injection aperture of the PRC. The latter means that the individual fluxes are effectively mixed in the PRC before being coupled into the SRC. Therefore, the flux of any combination of monochromatic (e.g., RGB) LEDs, or any other sources of different spectral composition and/or color, when extracted has an identical power averaged spectrum and hence ideal color uniformity. The latter one is especially important for RGB LED backlights for color sequential LCDs, which in addition to luminance uniformity require unusually high degree of color uniformity, to name but one example. Similarly, when used with white LEDs known to have intrinsic yellow-blue hues, HOW-HOPE will produce a constant color over the illumination window. HOW-HOPE also enables to replace "white" LEDs with a fixed color by RGB LEDs in devices, which require a source of light with an adjustable "white" color. In addition RGB based FID can provide a reference white light of any Color Temperature or saturated colors within the gamut of the primary LED lamps.

The SRC no matter how implemented may also incorporate over at least one of its faces specially distributed light extractor means in order to ensure a luminance uniformity. The density distribution function and type of the extractors is an important consideration and should be determined by iterative methods in order to ensure both uniformity and high radiant efficiency of the ejected light. Light extractors can be formed by means known in the art such as painting, etching, engraving, micro-replication machining techniques, lithography roughening, micro-lenses of different shapes, laser ray scanning, forward scattering materials for SRC, and holography to name but a few. Specific light extractors and methods by which they may be formed are described in the previously mentioned Ser. No. 10/145,178 patent application incorporated herein by reference.

Figure 8A:
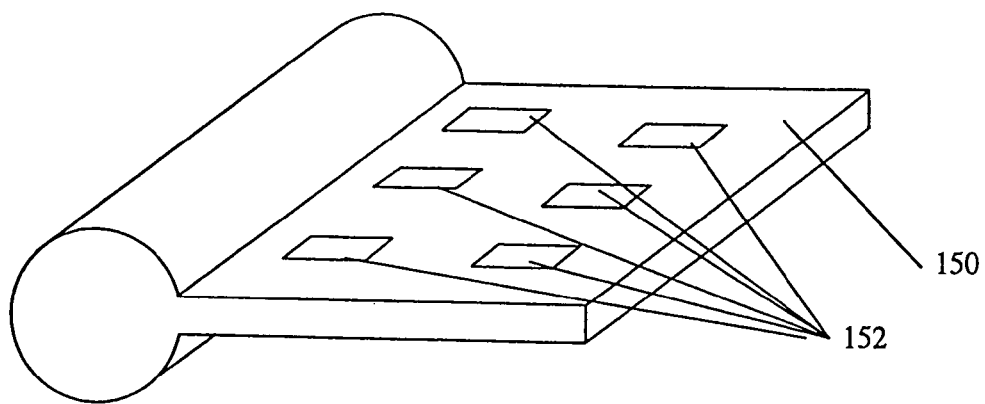
FIG. 8A illustrates a HOW-HOPE system with an SRC having localized discontinuous flux extracting cutouts, in accordance with the instant invention.
Figure 8B:
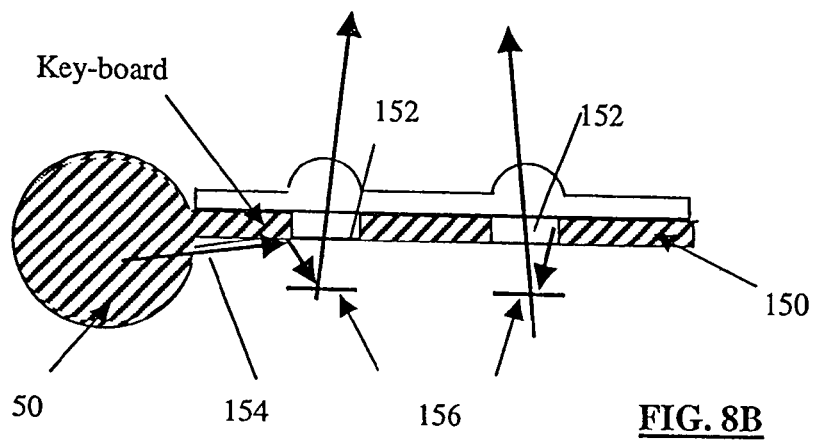
FIG. 8B illustrates a monolithic HOW-HOPE system with keyboard information carrying panel and a SRC having localized discontinuous flux extracting cutouts, in accordance with the instant invention.

In yet another embodiment as illustrated in FIG. 8A and FIG. 8B there is shown a HOW-HOPE system with an SRC having localized discontinuous flux extracting cutouts, which may have any suitable shape, e.g., circular, elliptical or rectangular to name a few. More particularly, and as is shown in FIG. 8A, an SRC 150 can have localized cutouts or holes 152. As depicted in FIG. 8B, the photons travel inside SRC 150 along arrow 154 from PRC (e.g., 50 of FIG. 2) hit a vertical edge of a hole and are coupled out. A back reflector 156 may be disposed locally to insure that all the light is extracted in a desired direction to illuminate the overlaid device, e.g., a keyboard or instrument panel as illustrated in FIG. 8B. In order to secure an effective ejection the hole dimensions should be larger than in its thickness (X,Y>>Z). The diameter should also be different being larger for HOPE domains with small density of the internal propogating flux. As should be obvious from FIG. 8B, a HOPE, due to its greatly reduced thickness and mechanical flexibility can be adapted to become a modified keyboard with a built in monolithic PRC.

Any of the faces or surfaces of PRCs and SRCs (except injection and extraction apertures) can have coated or exterior reflection means with mirror, diffuse, or mixed reflection. A back reflector can also be placed behind one of an SRC's faces to direct all of the extracted light into the illumination window.

Optionally, one or more of the following light shaping films could be positioned above the illumination area: a diffuser film (e.g., 64 of FIG. 2A); a single BEF (Brightness Enhancement Film) film having micro a prismatic profile or two crossed BEFs (e.g., 66 of FIG. 2A); or a DBEF (Double Brightness Enhancement Film) film (e.g., 68 of FIG. 2A). Each of these types of films is known in the art.

Figure 9:
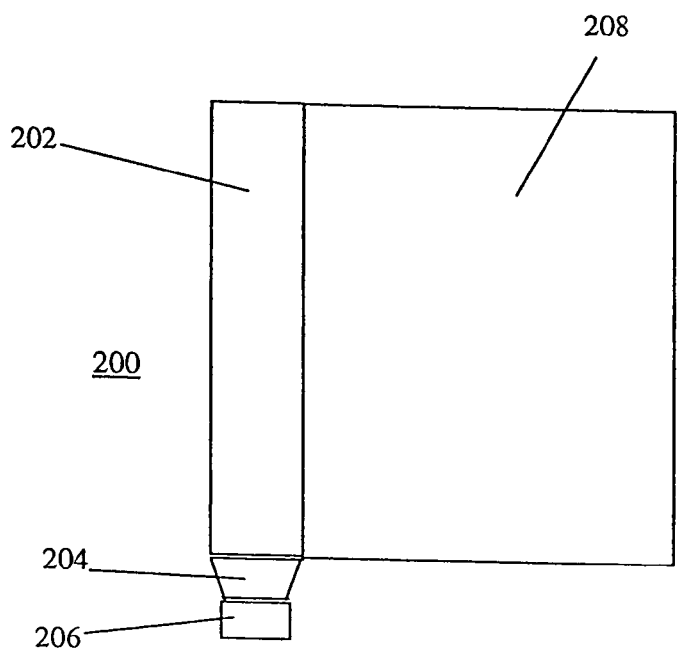
FIG. 9 illustrates a HOW-HOPE system with a PRC having a symmetric foconic coupling section, in accordance with the instant invention.

In yet another embodiment of the invention shown in FIG. 9, there is illustrated a HOW-HOPE system 200 with a PRC 202 having a symmetric focussing conic or "foconic" coupling section 204 with a different shape than the cylindrical PRC. The foconic coupling section 204 provides for an efficient coupling of the immersed, bonded, or external light source 206 (i.e., one or more LEDs). Of course, a SRC/LGP 208 is coupled to the PRC 202. A direct (bonded) coupling has higher efficiency by reducing the Fresnel retroreflections from an LED lamp to air and air to PRC interfaces. For a PRC with a circular cross section such foconic section is generated by a rotation of the profile curve around a PRC's longitudinal axis "Y". The profile is calculated to reflect, preferably by TIR, all the flux emanating from the immersed source under such angles that they subsequently hit the PRC main cylindrical sections under the angles equal to or larger than a critical angle, i.e., propagate along PRC by TIR. For example for N=1.5 the critical angle is 41.8 degrees.

A foconic coupler can also be effectively used to collimate the flux inside the PRC. It has been discovered that collimating the flux enables a design more effective for light ejection and extraction and with a higher degree of intensity or luminance amplification around the desired spatial direction. In other words, a foconic PRC can achieve a higher degree of spatial directivity of the extracted light. For example, a TIR parabolic focon produces the maximal collimation of the radiation within its cut-off angle. The degree of collimation increases for larger exit aperture of a focon.

Symmetric focons produce equal degrees of collimation in azimuth and elevation directions (saggital and meridianal planes). However, for some application devices it may be of interest to collimate the flux in only one preferential plane. For such circumstances, asymmetric foconic couplers may effectively perform this function, especially when used with PRCs having a rectangular cross section (such as that illustrated in FIG. 2D).

Referring now to FIGS. 10A and 10B, there is illustrated therein a HOW-HOPE backlight system 210, in side (FIG. 10A) and top (FIG. 10B) views, with an asymmetric foconic coupling section of elliptic, truncated pyramid shape 212. The elliptic focon 212 is coupled to a circular shaped PRC 214, which collimates the source radiation in elevation angles. With an elliptic focon, the radiant intensity distribution of the internal PRC flux is significantly different in two principal planes, producing a selective flux collimation. The PRC may also have an elliptic form congruent with an exit aperture of the focon. The PRC 214 is of course coupled to an SRC 216, as described above.

Figure 1B:
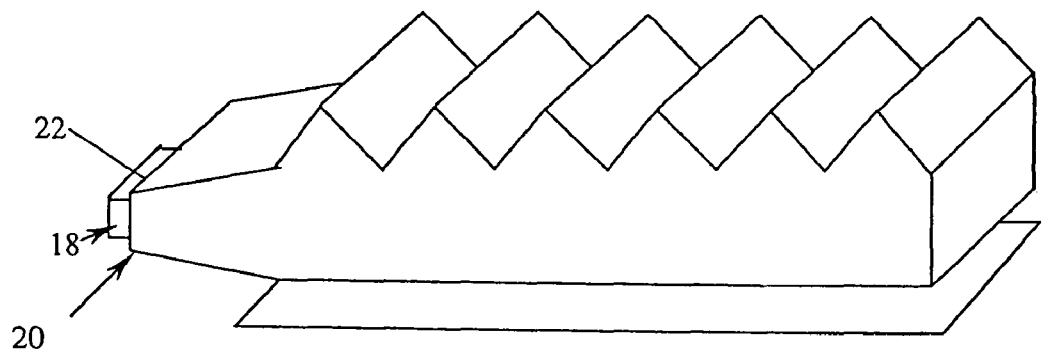
FIG. 1B shows a prior art frontlight illuminator for a reflective LCD, containing an LGP with a collimating section and micro prismatic light extractors.
Figure 11A:
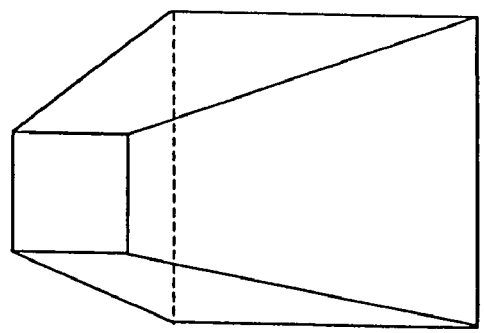
FIGS. 11A through 11C illustrate different possible shapes of symmetric and asymmetric coupling sections of a PRC, all, in accordance with the instant invention.
Figure 11B:
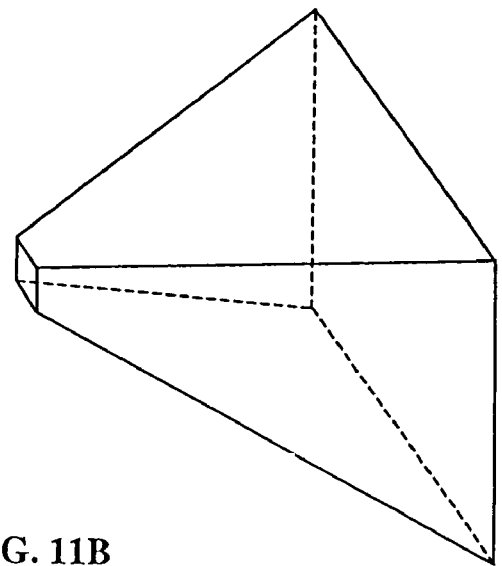
Figure 11C:
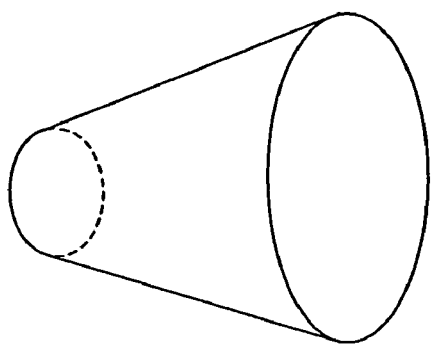

While focons have been described as either symetric or asymetric in FIGS. 9 and 10 respectively, it is to be understood that focons can be formed for a PRC of many different cross sectional shapes, a small number of which are shown in FIGS. 11A to 11C. Indeed, it is to be understood that in addition to being either symmetric or asymmetric, the foconic section may also and further be elliptic, hyperbolic or hyperbolic-elliptic. The foconic section may also be compound in shape—that is, there are one or more sectional conic sections to the focon. Thus, for a rectangular or square PRC a focon represents a truncated pyramid with generally different base dimensions, such as depicted in FIGS. 11A and 11B. Such PRCs are especially effective in frontlight devices for reflective LCDs. Frontlight devices for LCDs require a one-sided light extraction towards the LCD, so that as little light as possible is extracted towards an observer from the SRC itself in order to prevent LCD image wash-out. It is known that light entering an LGP should be essentially collimated to produce a desired directional extraction. Indeed, FIG. 1B shows a prior art frontlight, which has an LGP with a collimating section and micro prismatic light extractors. This prior art collimating section however, causes a significant increase of the thickness of the whole light extracting area of the LGP, which frequently renders its usage impractical. In contrast to this prior art device the HOPE system described herein preserves the minimal unchanged thickness of the SRC, so that only the PRC, located outside the display area, has an increased thickness. Apart from this major benefit, a foconic PRC collimates the primary flux in all directions, while a prior art device allows only one-dimensional collimation along one spatial direction.

It is to be understood that focons can also be used with non immersed light sources without a direct optical contact with a PRC. To produce a collimated light extraction, prismatic or micro-lens shaped extractors with a non-uniform cover factor can be used in a SRC. It is to be further understood that while the PRC and SRC considered until now had the same refraction index N, generally they can be different. If $N_{SRC} > N_{PRC}$ the flux coupled into a SRC will be further constricted to the cone within $\alpha < ARC\ SIN(1/N_{SRC})$. Such a constriction enables one to achieve more spatially concentrated light extraction.

Reflective LCDs.

As already mentioned in the background section, it would be highly advantageous to remove a transflector in reflective LCDs and instead to use a reflector with a ≈100% reflectance. As described, two fundamental factors have precluded such a solution until now. Conventional backlights are on the order of 0.6-1.5 mm thick, hence placing a reflector behind the backlight would increase parallax and, consequently, image degradation, which is already considerable in outer-surface reflective configurations of LCDs. Secondly, the scattering light extraction means of a conventional backlight causes a polarization change of the reflected light (on forward and backward passes) resulting in a lower reflectance and contrast ratio in a reflective mode.

The HOPE with an ultra-thin SRC as described herein is ideally suited to solve the first problem. Indeed, their thickness can be reduced to a micron level, albeit, at an expense of some drop of the efficiency. For practical systems 50-500 microns will suffice in most cases, as it is still much thinner than a 0.5-0.7 mm glass substrate or a 0.15 mm back polarizer of the prior art.

The polarization problem can be solved in a number of ways. First, light extraction can be affected by a weak non-uniform roughening of the SRC's surface, so that the maximal density of the extractors remains significantly below unity. Extractors represent novel quasi randomly distributed three-dimensional irregular shapes with a controlled tilt, which determine the degree of roughness. The master surfaces for mass production can be produced by etching, embossing, laser ray scanning or holographic methods. Software has been develop to generate rough surfaces with a controlled scattering and reduced polarization change. The peaks and valleys of such a 3D stochastic, fractal or regular structure have been synthesized according to a two dimensional probability density function ("PDF") and cross correlation functions. The waveguide with discontinuously roughened faces is then subjected to iterative analysis to determine both an optimal surface roughness pattern and its CF distribution over the HOPE assuring both a desired spatial luminance distribution and its uniformity over its active face. With such a SRC, most of the light will pass through the SRC's areas, which are flat (and have no effect on polarization) or through the weakly roughened extractors, which introduce only a minimal polarization variation. Such SRC also functions as a diffusing layer with controlled light scattering properties, required for reflective LCDs with a mirror back reflector.

Figure 12A:
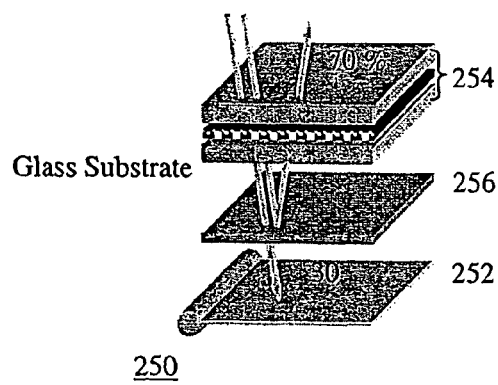
FIG. 12A illustrates a HOW-HOPE system used as a backlight for a reflective LCD for in a conventional scheme employing a transflector with 70% reflection and 30% transmission, in accordance with the instant invention.
Figure 12B:
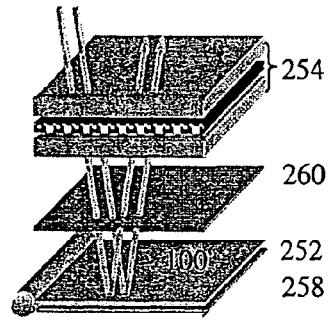
FIG. 12B illustrates a HOW-HOPE system used as a backlight for a reflective LCD with a conventional transflector replaced by a polarization preserving diffuser, in accordance with the instant invention.

The HOPE backlight system can also produce a better then conventional optical performance when used with other optical components, such as reflective polarizers (similar to DBEF of 3M Company), polarization preserving diffusers (Microsharp Corporation), holographic reflectors (DuPont) and other commercially available optical films. Recycling polarizers like DBEF can also be inserted into a coupling between the primary light source and a PRC, so that the SRC will emit a polarized light, resulting in higher effective transmittance of the LCD in a backlit mode Referring now to FIG. 12A and FIG. 12B there is illustrated therein exploded side views of a HOPE system similar to the one depicted in FIG. 2C, and which is adapted for use as a backlight for reflective/transflective LCD device 250. The HOPE backlight system 252 can be used in a prior art configuration employing a transflector, as shown in FIG. 12A. Specifically, the reflective/transflective LCD 250 includes the HOPE backlight system 252 as described above, disposed on the viewer distal side of an LCD module 254. Disposed between the HOPE backlight and the LCD module is a transflector 256, as described and known in the prior art. Similarly, FIG. 12B illustrates a backlight architecture with the transflector 256 of FIG. 12A being removed. In FIG. 12B however, the functions of the transflector are taken over by a back reflector 258 disposed on the viewer distal or backside of the HOPE backlight 252. In this case, a conventional diffuser 260 may be disposed between the HOPE backlight 252 and the LCD module 254. It is also to be understood that the SRC/LGP 252a of the backlight can be directly bonded to the back glass substrate of the LCD module 254. This operation can be incorporated into the LCD manufacturing process and reduce total device cost and assembly complexity. In order to preclude an undesirable leakage of light into the LCD in a backlit mode, the SRC/LGP can be made from a material with a higher refractive index of 1.6-2.2 than the module. Alternatively, a polarizer can be added to a coupling section of a PRC. A use of foconic coupling section, as described above, will further restrict the leakage by constricting the flux inside the LGP within a narrower angular cone.

Figure 12C:
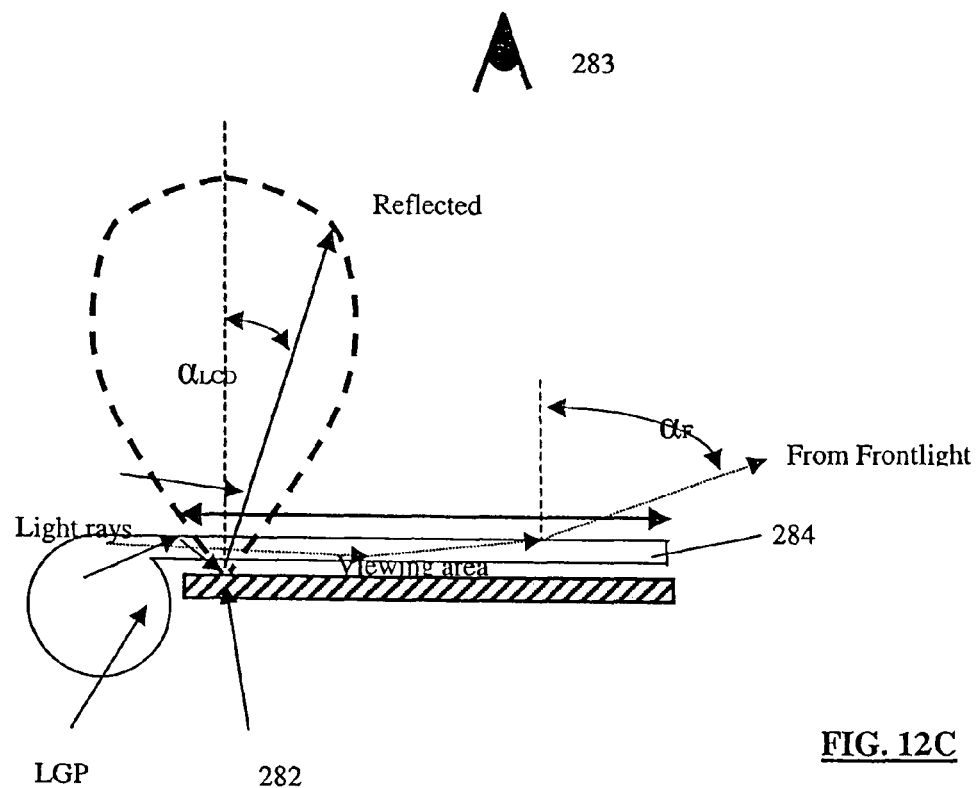
FIG. 12C illustrates a HOW-HOPE system used to frontlight a reflective LCD, in accordance with the instant invention.

Referring now to FIG. 12C, there is illustrated therein a HOPE device 280 for frontlighting of reflective LCDs 282. As may be appreciated by a perusal of FIG. 12C, in this instance, the HOPE system is disposed on the viewer proximal side of the LCD module, that is, between the LCD 282 and the viewer 283. By using weakly scattering light extractors the light extraction from the planar SRC/LGP 284 into an outward direction occurs at a large angle ($\alpha_f$) relative to the viewing direction (grazing angle), i.e., it will not cause any observable washout of the image contrast. This washout is inherent in conventional frontlights, as the light is extracted through both sides of a conventional LGP. The light extracted towards LCD 282 will also be at grazing angles. However, if a reflecting substrate of the LCD has light scattering properties, the incident light will be diffused and escape the LCD within an angular cone ($\alpha_{LCD}$) including an observer EMB (eye motion box). Therefore in the present embodiment, LCD reflectors with controlled scattering parameters, such as holographic reflectors etc. can significantly improve LCD luminance above the levels possible in conventional devices with less directed extraction.

Hybrid Optical Waveguide with Multiple Distributed SRC Ejectors with Sculptured Radiant Intensity Distributions.

Cylindrical fiber optics light pipes (LP) have been traditionally used to transport light from an injection to ejection aperture at a distant endface. More recently, LP with principally different functionality has drawn considerable interest. Instead of just transporting light over the pipe, these LPs have a distributed, preferably uniform extraction (i.e. output) of the coupled light over the whole length of the pipe. In order to make such LP energy efficient the light extraction should, preferably, be directional, and generally, centered around the direction which is normal to the pipe's longitudinal axis or "Y" axis. These systems are designed to emulate conventional linear fluorescent and the well-known "neon" tubular lamp lighting widely used in signage, architectural and occasionally functional lighting. Many attempts have been made to achieve a directional distributed light extraction by having various cuts and notches or bubbles in the core and cladding of the LP. Most of these devices have poor directionality, causing low luminous efficacy and high luminance nonuniformity. These are some of the reasons impeding a usage of LEDs in these applications. Conventional LPs with directional ejection features also require complex manufacturing process and are expensive. By contrast, a novel modified HOPE system will be described hereinafter referred to as a Distributed Optical Pipe Ejector or "DOPE" and which features highly effective multiple directional light ejectors, that are distributed over substantially the length of the PRC.

The relatively recent commercial emergence of "High Brightness" LEDs with an improved luminous efficacy and higher device power offers new possibilities for DOPE devices. Indeed LEDs have a very long life, are compact, robust, easy to mount, and can emit a wide gamut of saturated colors. However, they also have a number of inherent limitations inhibiting their use, in particular low power of individual LEDs and relatively high cost in terms of lumens per watt. These limitations have severely hampered an introduction of LED based LP products into a general lighting consumer market. One should also realize that a cost of an LP itself affects a total device cost. One can conclude that an advantageous way to facilitate penetration of these systems to market is to: (i) increase the directivity and extraction efficiency so that a sparse and expensive LED generated flux could be used more efficiently; and (ii) make the light conduit system less expensive and more efficient by reducing its cross sectional size and its absorption losses. At least the former objective can be attained by a modified HOW-DOPE system. The latter objective can be attained by a modified HOW-system, which will be referred to herein as a Distributed Optical Pipe Injectors or "DOPI" for short.

Figure 13:
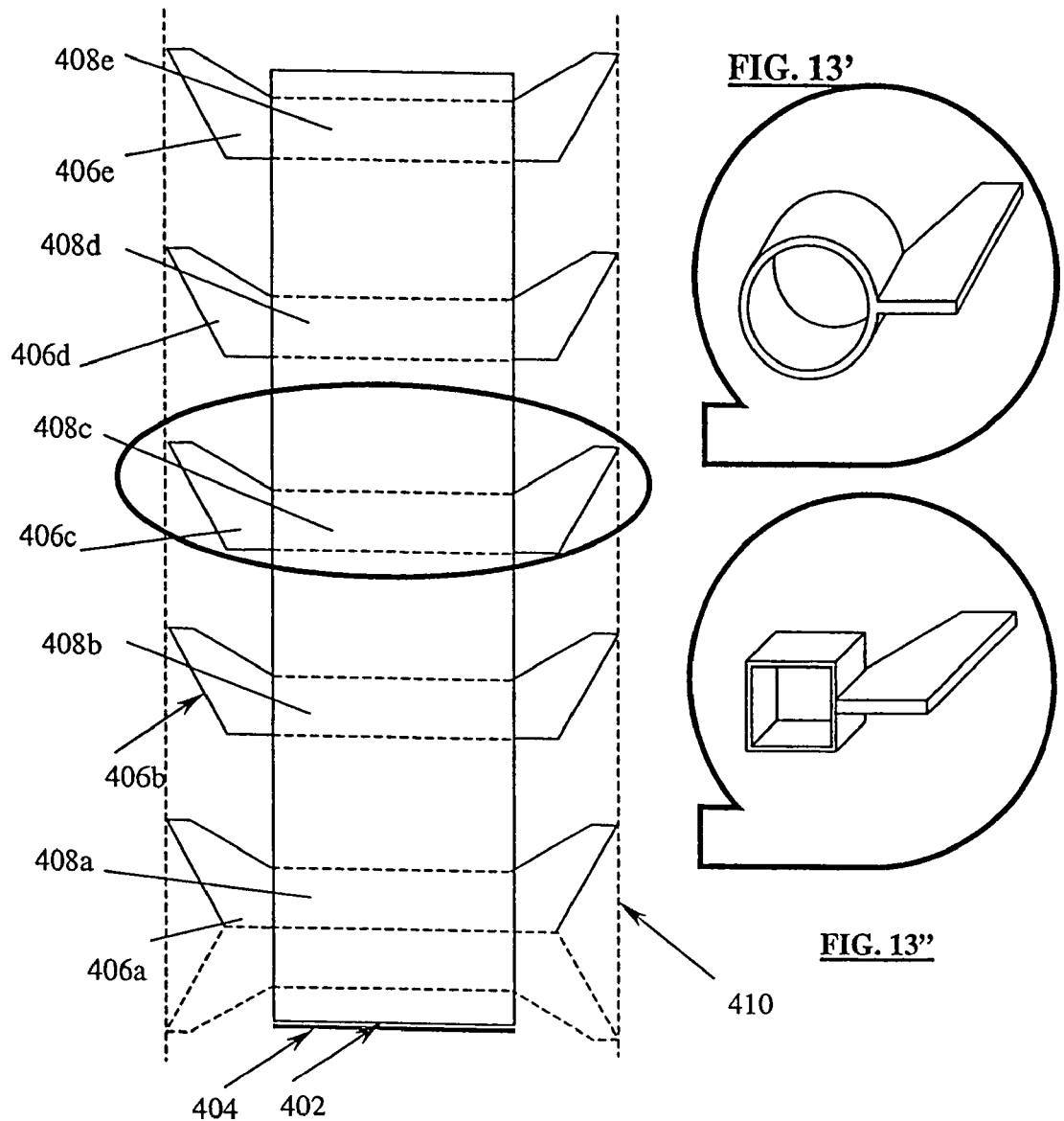
FIGS. 13, 13' and 13" illustrates a monolithic HOW-HOPE system with multiple unidirectional and bidirectional SRC ejectors coupled to a PRC, in accordance with the instant invention.

As will become evident from the following description, modified HOW-DOPI and HOW-DOPE systems offer principally new and remarkably effective solutions for this class of devices. Referring now to FIG. 13 there is illustrated therein an exemplary embodiment of HOW-DOPE device with multiple unidirectional and bidirectional DOPE ejectors coupled to the PRC over its whole length. Note that in these FIGs. the DOPEs are shown not to scale. The actual size of the DOPE/SRC is on the order of the PRC's diameter. In this embodiment, the HOW-DOPE system 400 still includes both a primary radiation carrier ("PRC") and a secondary radiation carrier ("SRC") as described in general above. In the embodiment illustrated in FIG. 13 the PRC is the elongated cylindrical or other shaped member 402 having a light source 404 as described above coupled at an end thereof. The SRC is formed as a single or multiple annular or ring-shaped DOPE elements 406a, -406e, that are molded as a separate part, which includes a transparent elastic ring e.g., 408a-408e conforming to the PRC's cross sectional shape. Inset FIGS. 13' and 13" illustrate two different shaped annular elements for conforming to different shaped PRCs. Alternatively, the device sections can be injection molded as a single monolithic part. These rings can be attached to the PRC, whereby the optical contact is maintained through a mechanical spring force, by bonding, by elasticity or by heat shrinking of the ring. An additional exterior cladding pipe 410 can also be used to provide environmental protection. Preferably, the cladding is made from a low reflectance (black) material except for windows or openings adjacent the DOPE elements in order to reduce the reflected ambient light and to increase an effective contrast and, consequently, visibility of the ejected light. Though it is not illustrated in FIG. 13, it is to be understood that the light source 404 may be coupled to the PRC 402 by a foconic section as described above. It is to be further understood that while only five DOPE elements are illustrated, the invention is not so limited. Any number of DOPE elements may be spread in any density may be employed.

Figure 14E:
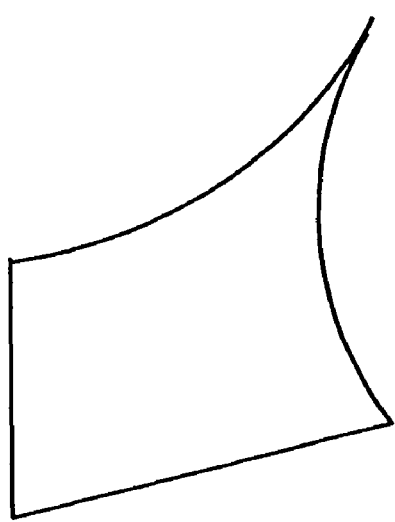
Figure 14F:
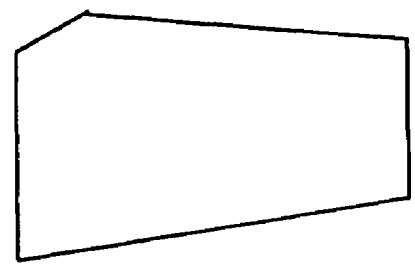
Figure 15E:
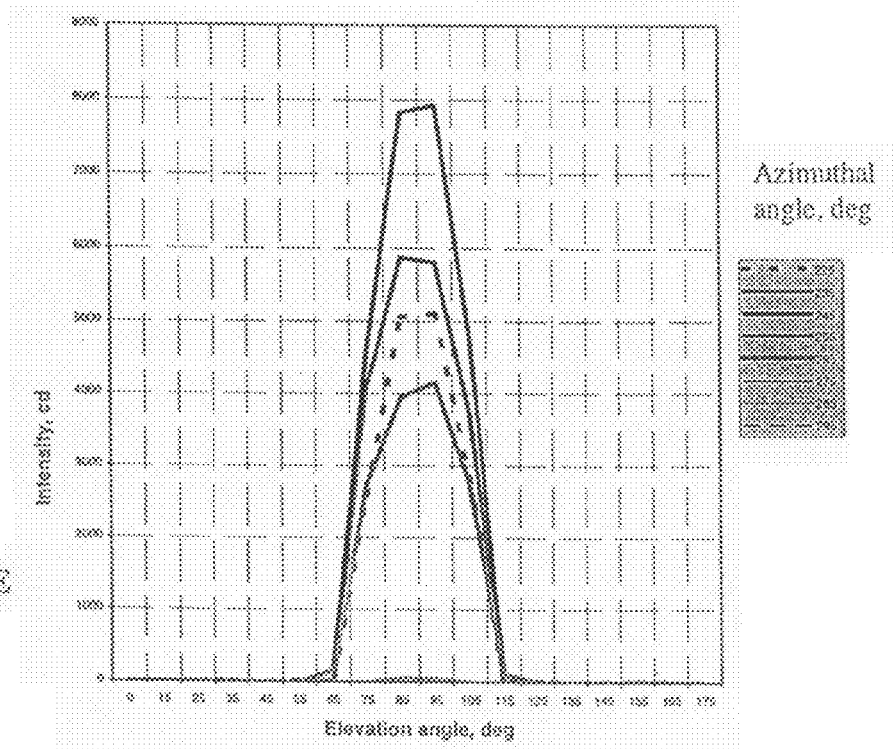
FIGS. 15E and 15F show graphs of a normalized radiant intensity distribution of two DOPEs with directed flux ejection.
Figure 15F:
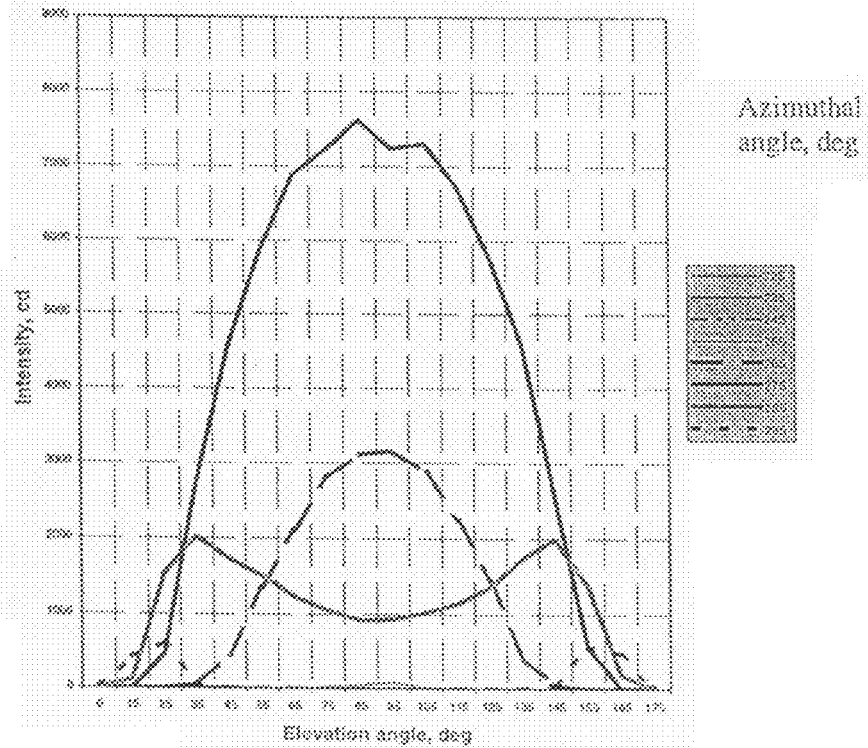

Referring now to FIGS. 14A through 14F there is illustrated therein a series of examples of DOPE element configurations for producing directional light extraction in controlled azimuthal and elevation directions centered around the normal to the Y and Z axis of a PRC (270 and 0 degrees respectively). As described above, DOPEs can be considered as a specially modified type of a SRC, which accomplishes a local directional extraction of a relatively small fraction of the flux propagating along the PRC. A large number of such DOPEs can be coupled to the PRC along its longitudinal axis Y as illustrated in FIG. 13. Imparting a special shape to the DOPE ensures the directionality of the extracted flux. It represents a specially shaped planar LGP/SRC with its front edge forming an angle:

$$0 < \theta < \theta_c$$

with Y axis of PRC. Some of the edges can have a linear shape as is illustrated in FIGS. 14A and 14B, while others may have a curved shape as in FIG. 14C. In either case, the shape is calculated to reflect light initially coupled from the PRC flux into the required azimuthal and elevation directions. The rest of the SRC's edges can also cooperate in redirecting the extracted flux, either by TIR or by direct extraction. Understanding these considerations, it is possible therefore to create a number of different shapes and geometrical configurations, some of which are shown in FIGS. 14A-14F. Such DOPE ejectors with differently shaped linear or curved edge sections can be designed to sculpture the radiant intensity distribution of the ejected flux in conformance with particular requirements. The absolute amount of the ejected flux is controlled by the DOPE's coupling length ($Y_c$) and its relative thickness ($Z_{dope}$) For example, when the PRC is relatively long (i.e., a large $Y_{prc}$) and a uniform flux extraction is required over its whole length, multiple SRC ejectors with small $Y_c$ and/or $Z_{dope}$ should be used. The configuration of an ejector is invariant with respect to $Y_c$, i.e., a particular configuration can be obtained by a simple scaling of a basic configuration by a factor $Y_c$. Typically the ejector dimensions are much smaller then the diameter of the PRC.

It is to be further understood that a DOPE can be of unidirectional (U-DOPE) or bidirectional (B-DOPE) type. U-DOPE is designed to eject a forward propagating flux for a PRC with a light source coupled to its frontface port. B-DOPE accepts forward and backward fluxes and is used in a PRC with the primary sources coupled to its both apertures. A bidirectional system may be considered preferable for some applications due to three advantages: (i) more flux can be coupled into a PRC of a given diameter; (ii) the total of the ejected by a single DOPE backward and forward flux remains constant over the PRC's length; (iii) all DOPEs have an identical dimensions. In view of a small angular dimensions of a B-DOPE it is visually perceived as a single point light source having a constant perceived brightness. A number and/or dimensions of DOPEs for a bidirectional HOW system is preferably designed in many applications to extract all coupled flux in a single forward pass in order to prevent attenuation losses in the PRC and minimize losses due to a residual flux, which were already mentioned in a foregoing section. In unidirectional systems one can counterbalance the attenuation of the flux in the PRC and attain a uniform luminous intensity along a whole length of the HOPE by gradually increasing Z, $Y_c$ and/or decreasing the distance or spacing between individual DOPE elements. Hence, while the DOPE elements illustrated in FIG. 13 are substantially uniformly spaced relative to one another, it is to be understood that the distances between such elements need not be so uniform.

In terms of counterbalancing the flux in the PRC, the former of the two previously mentioned methods is generally preferable, as it produces better subjective appearance. In addition to high concentration, the discrete HOPE can result in orders of magnitude additional energy savings. Indeed visibility of a linear source increases with its size only up to a certain limit, typically subtending several minutes at an observer's eye (so called zone of a total neural summation). Therefore, most of the energy emitted by continuous conventional fluorescent tubes is wasted as far as their visibility is concerned—they can produce higher illuminance levels but this is irrelevant for visibility aspects. On the other hand, the human visual system is very effective in recognizing shapes having discrete patterns, especially if they represent well-learned and familiar symbols, such as fonts and other pictorial information. Making LEDs operate intermittently at around 60 flashes per second will further improve the visibility.

Since all of the light is, generally speaking, extracted only towards one side of a PRC and can be additionally selectively constricted in either elevation or azimuthal angles by means of asymmetrical foconic coupling sections, very significant on-axis intensity amplification can be achieved with the HOW-DOPE system illustrated with respect to FIGS. 13 and 14. This fact is illustrated in FIGS. 15A, 15B and 15E and 15C, 15D and 15F which show the results of an actual ray tracing and luminous intensity diagrams for two PRCs with asymmetrical focons and relatively simple DOPE shapes similar to FIG. 14B resulting in a maximal on-axis intensity amplification factor of approximately 8 relative to a 1000 PI=1341 lm lambertian source with a normalized 1000 cd on-axis intensity coupled to a PRC. The latter means that the system's power efficiency is larger by at least the same factor compared to an ideal conventional system producing hemispherical lambertian ejection. Compared to conventional systems the factor is still larger by a factor of two, as they generally eject light isotropically in all directions. A multiplicity of such small SRCs ejectors can be bonded or mechanically attached to a cylindrical PRC to produce a distributed localized directional light ejection over its whole length. The SRC ejectors can be incorporated as an integral part of a protective cladding means of PRC or by other means ensuring an optical slit coupling of PRC and SRCs.

How with Multiple Distributed SRC Flux Injectors.

In all classical fiber optics light systems, the flux is injected through a single input aperture, on a front face of the light pipe. Such injection architecture suffers from a number of serious drawbacks, which severely impair its performance. First, the maximal injected flux quantity is limited by an area of the aperture. In real systems this quantity can be significantly smaller than a theoretical upper limit, because of an aperture's fill factor and a need for an additional flux collimation to match a numerical aperture (NA) of the pipe (in case of pipes with cladding). The injected flux sets up an upper limit for the maximal length of functional LPs with a distributed flux ejection, which were described hereinabove. Indeed, this length is simply:

$$l_{max}=PO*F_{injeced}/F_{ejected}$$

where: PO is a power output efficiency;

$F_{injected}$ is the injected flux; and $F_{ejected}$ is the ejected flux per unit length of the LP (proportional to a mean luminance of the LP).

On the other hand there is an obvious practical rational in terms of simplicity, mechanical flexibility and device cost to have a longer continuous monofilament LP. A straightforward, "brute force" approach is to increase the LP's diameter (cross sectional area), or to use multiple short discrete LP, so that more multiple sources or a more powerful single lamp (i.e. HID lamp) can be coupled. The first solution calls for a proportional increase of cost and weight of the system. The second solution results in less flexible system requiring additional mounting elements and having flux losses on element-to-element interfaces.

To complete the analysis, consider next the losses to which the flux is subjected before being ejected. Assuming that flux should be ejected uniformly over the whole length of the LP these losses are proportional to:

$$F_1=1-\exp(-ALPHA_{ip}*l_{max}/2)$$

Where:

$l_{max}$ is LP's total length (for a more accurate estimate one should Integrate this equation over the trajectory of all photons filling LP modes).

For synthetic materials used in nontelecom applications an extinction factor $ALPHA_{ip}$ is relatively high so that the flux can be attenuated by 50% over a relatively short length.

Next consider a monolithic LP device which has multiple injection ports along its length interspersed with multiple DOPE ejectors designed to extract most of the flux injected from a proximate injector. Such a system allows injecting more flux into an LP and ejecting it over a relatively short photon travel distance within the LP, i.e. improving the device performance in two most significant parameters. Hence in another embodiment of the invention, a specially modified SRC wave guide flux injection element with a close to 100% coupling efficiency has been provided enabling distributed flux injection into a PRC from the multiple sources mounted along its longitudinal axis. A multitude of such injectors perform a task reversed to that one of DOPE—that is flux injection instead of ejection.

Figure 16A:
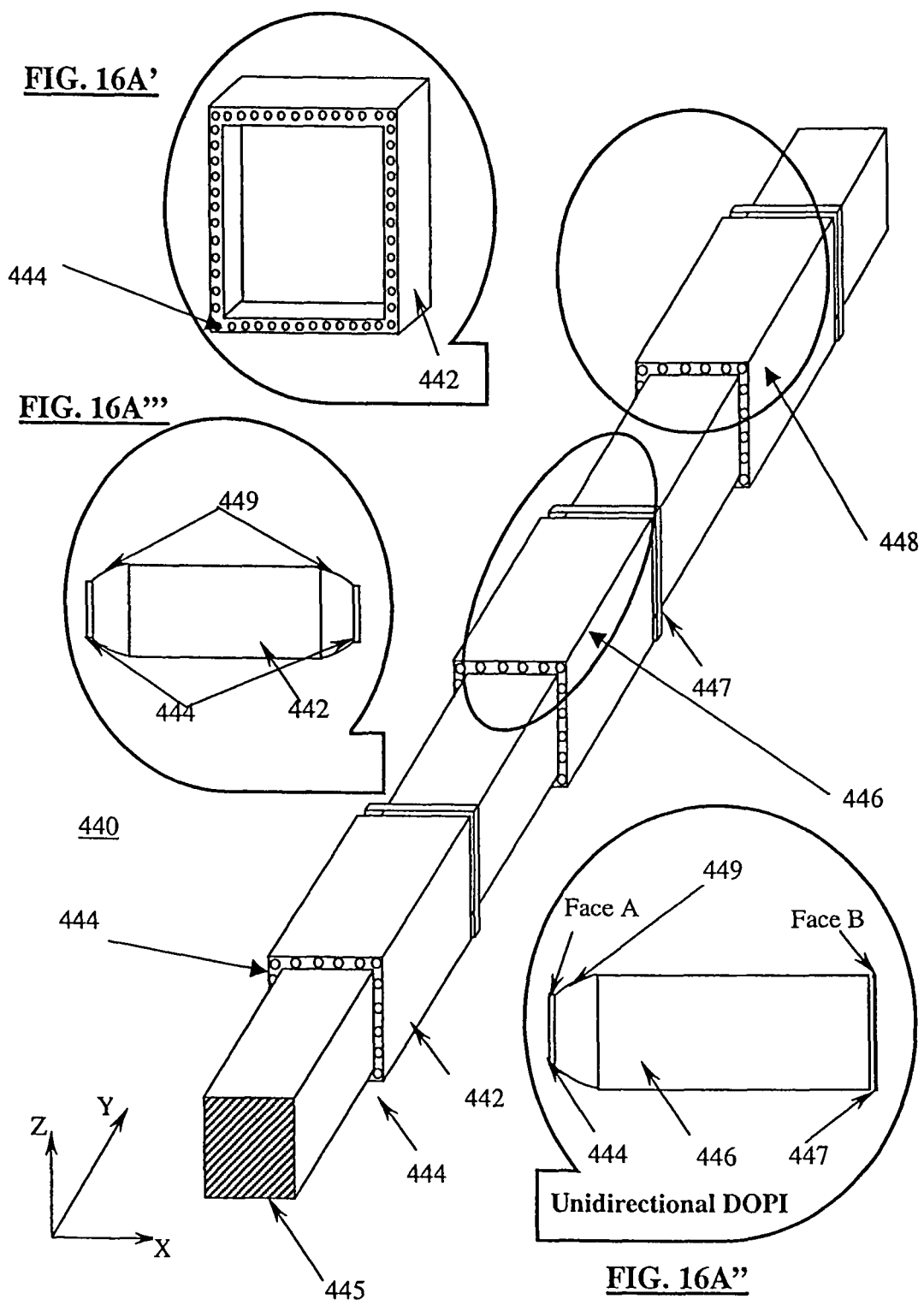
FIGS. 16A, 16A', 16A" and 16A'" illustrates a monolithic HOW-DOPI system of a rectangular cross section with multiple unidirectional and bidirectional injection ports distributed along a PRC, in accordance with the instant invention.

An exemplary embodiment of a lighting device 440 with such an element, termed Distributed Optical Pipe Injector (DOPI) 442 is illustrated in FIG. 16A. FIG. 16A includes a rectangular hollow SRC/LGP 442 (i.e, the DOPI 442 illustrated in inset 16A') with multiple or distributed light sources 444 coupled to at least one of its edges in X:Z plane normal to the axis of the PRC 445 e.g. LP. The SRC of the DOPI is optically coupled to the PRC along its axis Y. A width of the injection aperature DOPI is smaller than the PRC cross section: Z, $\leq Z_{prc}$. As may be appreciated from a perusal of FIG. 16A, the device 440 actually comprises a series of DOPIs 446 and 448 repeated along the PRC. While FIG. 16A illustrates only three repeating DOPIs, it is to be understood that any number of such DOPIs can be used in a system, and that the final number is determined by the specific application into which the DOPI is incorporated. The embodiment of FIG. 16A allows for the replacement of, e.g., fluorescent tube type lighting devices, and has the advantage of coupling all the injected light into a single aperature. The system may also include reflectors 447 adjacent to the DOPI elements.

Figure 16B:
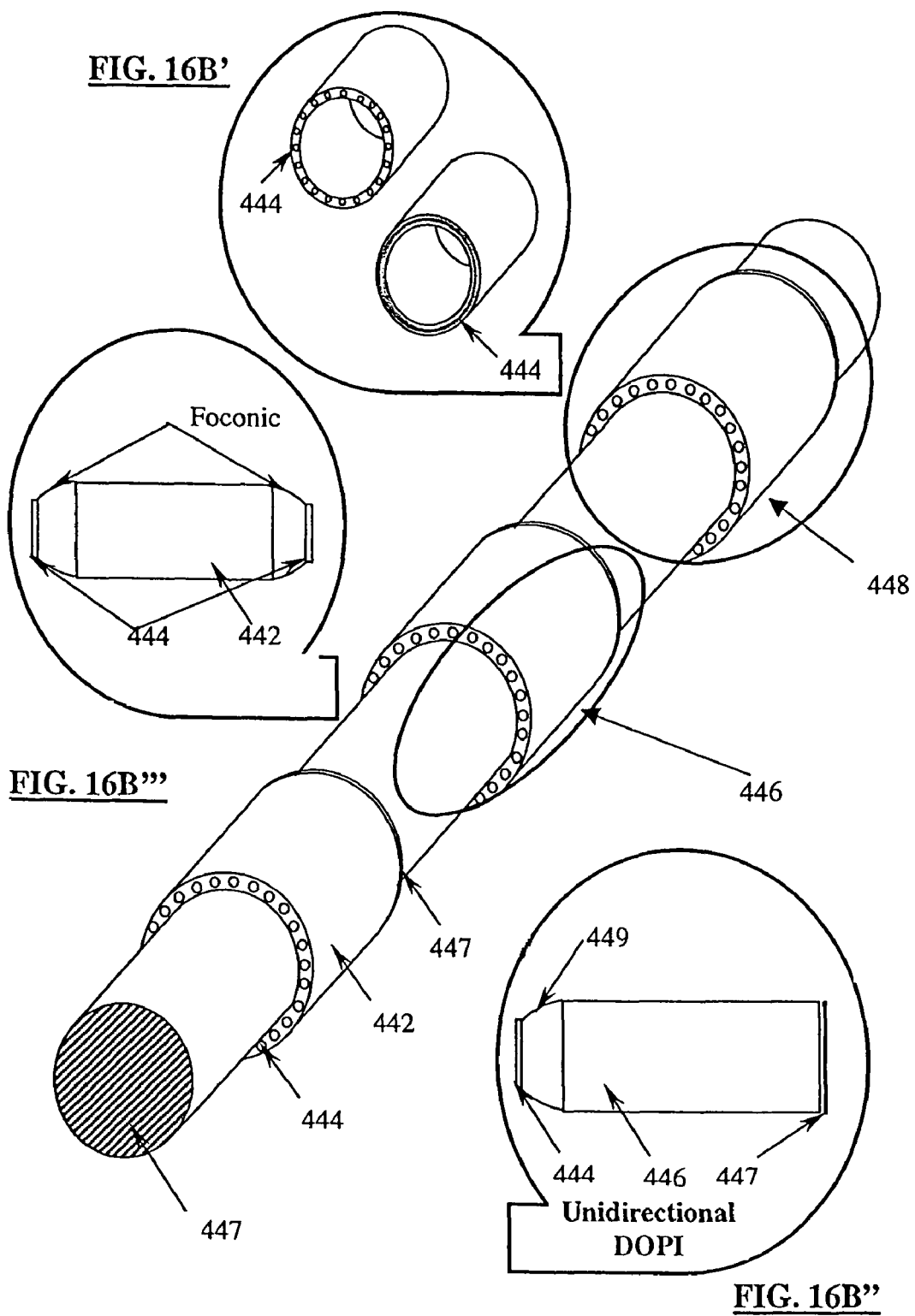
FIGS. 16B, 16B', 16B" and 16B'" illustrates a monolithic HOW-DOPI system of a circular cross section with multiple unidirectional and bidirectional injection ports distributed along a PRC, in accordance with the instant invention.
Figure 17:
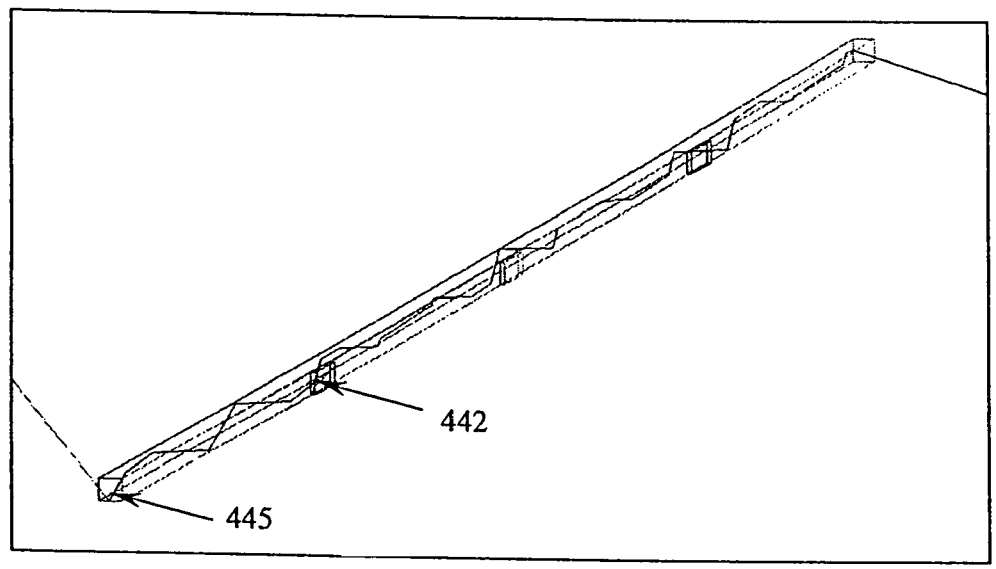
FIG. 17 is a ray trace pattern for a monolithic HOW-DOPI system of a rectangular cross section with multiple bidirectional injection ports distributed along a PRC, in accordance with the instant invention.

The light source(s) 444 may be allowed to have any luminance distribution and can be coupled externally or, preferably, immersed into the DOPI or optically bonded to it. In the latter case, DOPI should have a foconic, preferably TIR, coupling section 449 similar to that one already described hereinabove for a PRC. Such coupling increases the coupling efficiency and can be introduced to additionally collimate the coupled into the PRC flux in order to obtain more directed flux extraction and/or to reduce the flux losses within the PRC. Examples of how foconic coupling sections can be incorporated into the DOPI of FIG. 16A are illustrated in insert FIGS. 16A" and 16A'''. Using such a foconic coupling section, and as can be seen from FIG. 17 most of the flux is indeed coupled into the PRC and continues to propagate along it by TIR without any leakage, i.e. PRC and DOPI have matched NAs. A similar structure is illustrated in FIG. 16B wherein the PRC is rod shaped rather than square or rectangular as in FIG. 16A. Once again, the DOPIs can be repeated over the length of the PRC, and consist of hollow tubes, wherein the lights sources are either discrete light sources, e.g., LEDs or can instead be either cold or hot cathode fluorescent lamps, as shown in inset 16B'

Consider next a coupling efficiency of a PRC-DOPI architecture for a source coupled to the first (back) face A of the DOPE. An external diffuse/mirror or bonded mirror reflector covers the second face B. A fraction of the coupled flux impinges on the face B directly or indirectly after reentering from the PRC or by reflection from DOPI's own faces. The direct fraction can be calculated by using geometrical form factors (Radiation Transfer Theory), which should be modified for a case of immersion optics. It decreases with an increasing $Y_{dope}/X_{dope}$ ratio, i.e., for more elongated DOPEs. Specialized software may be employed to calculate the second indirect part, since it involves highly elaborate numerical methods. This indirect fraction decreases with an increasing ratio of the respective cross sectional area of PRC and DOPI, $S_{prc}/S_{dope}$. These principal conclusions can also be derived from the fundamental properties of the Light Field. This flux has to be minimized, in particular for unidirectional devices with concentrated extraction. As has been shown above, DOPE with such directional ejection should accept only forward propagating flux. They loose their directional properties for the backward flux. In bidirectional systems or in systems with less concentrated or isotropic extraction most of the flux reflected from face B will be effectively ejected after entering the PRC in backward directions. In this case, the losses are solely due to absorption of the flux reaching the light source in a steady state after Multiple Interreflections (MIR). A fraction of this residual flux can be absorbed by the light source, i.e., by LED lamp. For sources with high reflectance, such as CCFL and HCFL, most of this flux will be reflected into the PRC and eventually ejected. The inventor has found that with:

$$5 < Y_{dope}/X_{dope} < 40$$

$$2 < S_{prc}/S_{dope} < 10$$

losses of the residual flux on the primary source remain negligible, and a forward propagating flux constitutes 70%-85% of the initially coupled in a forward direction flux with the remainder propagating in a backwards direction. For bidirectional DOPE systems these constraints can be eased:

$$2.5 < Y_{dope}/X_{dope} < 40$$

$$1.5 < S_{prc}/S_{dope} < 10$$

Similar to HOW-DOPE systems, DOPI are preferably of a bidirectional type with sources coupled to both edges. As one can see an additional benefit of such a system is smaller size of DOPI, which result in further reduction of device cost.

Doubly Hybrid Wave Guide with Multiple Distributed Flux Injectors and Ejectors.

Figure 18A:
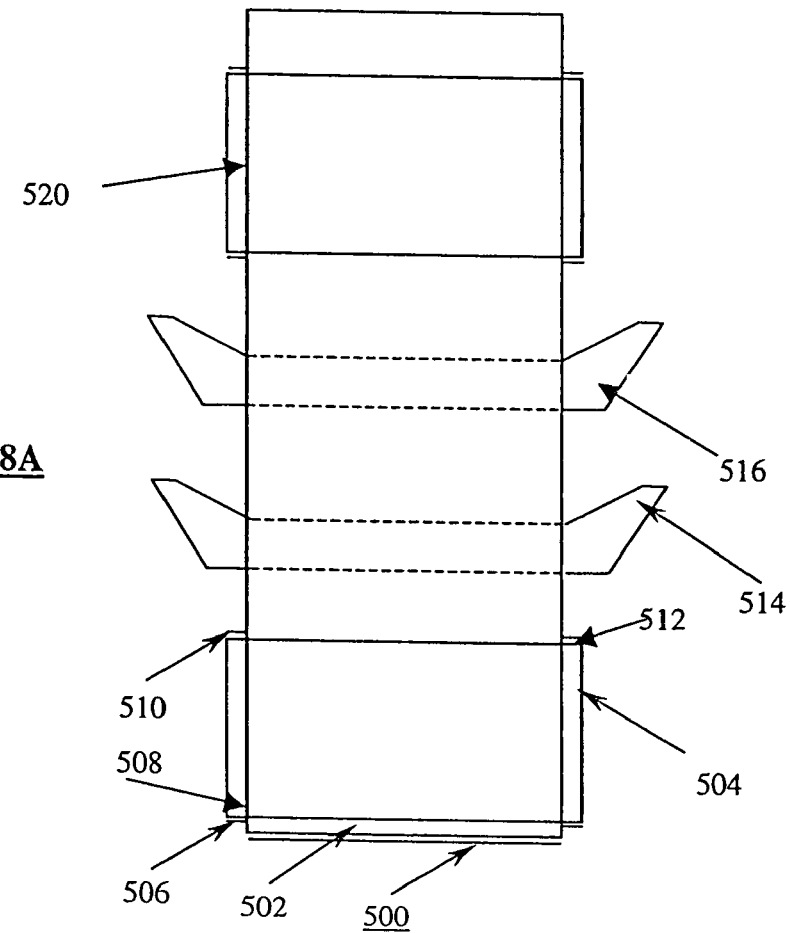
FIGS. 18A and 18B depict HOW-DOPI-DOPE systems with multiple unidirectional or bidirectional injection and ejection ports distributed along a PRC, in accordance with the instant invention.
Figure 18B:
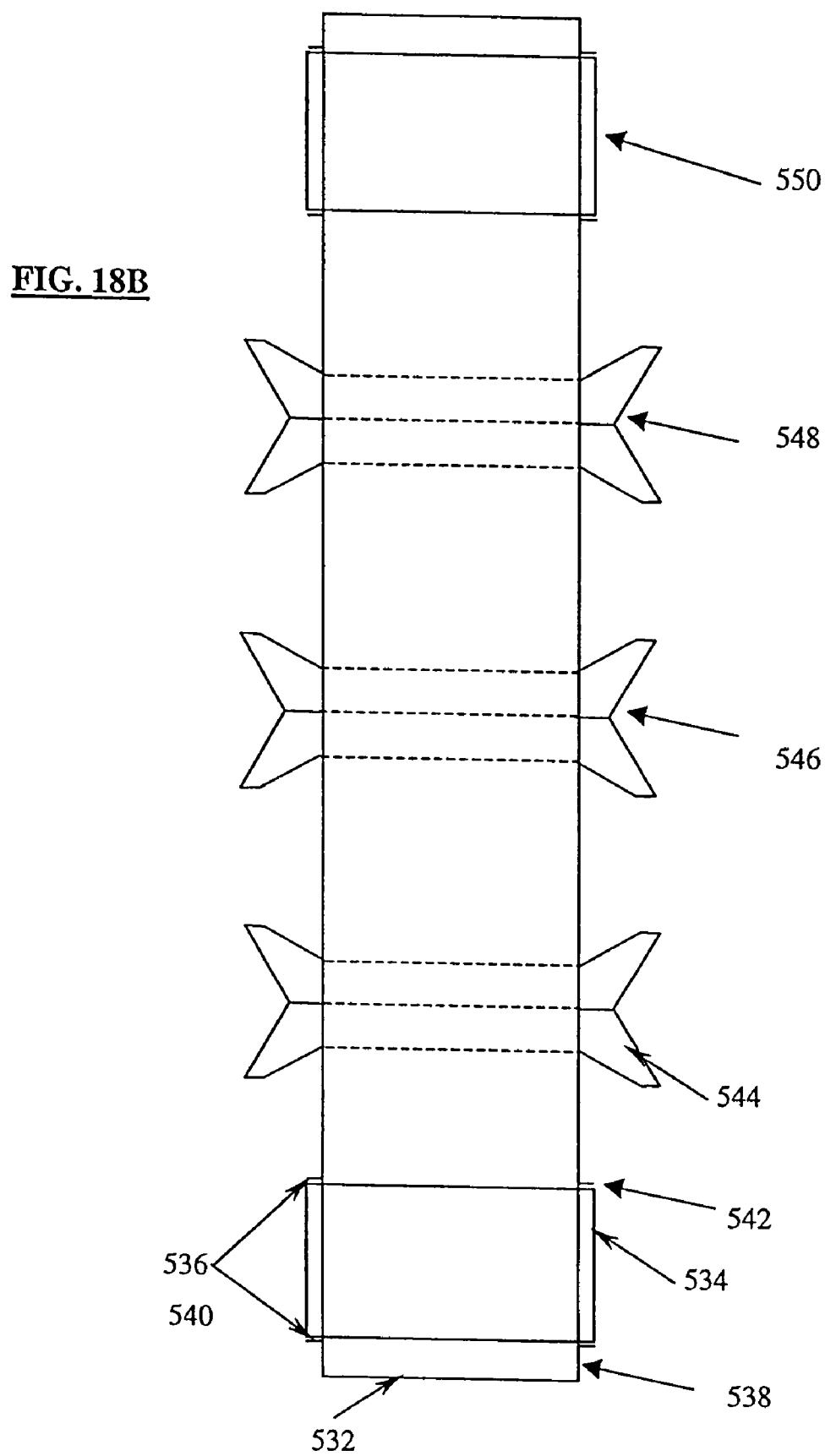
Figure 19A:
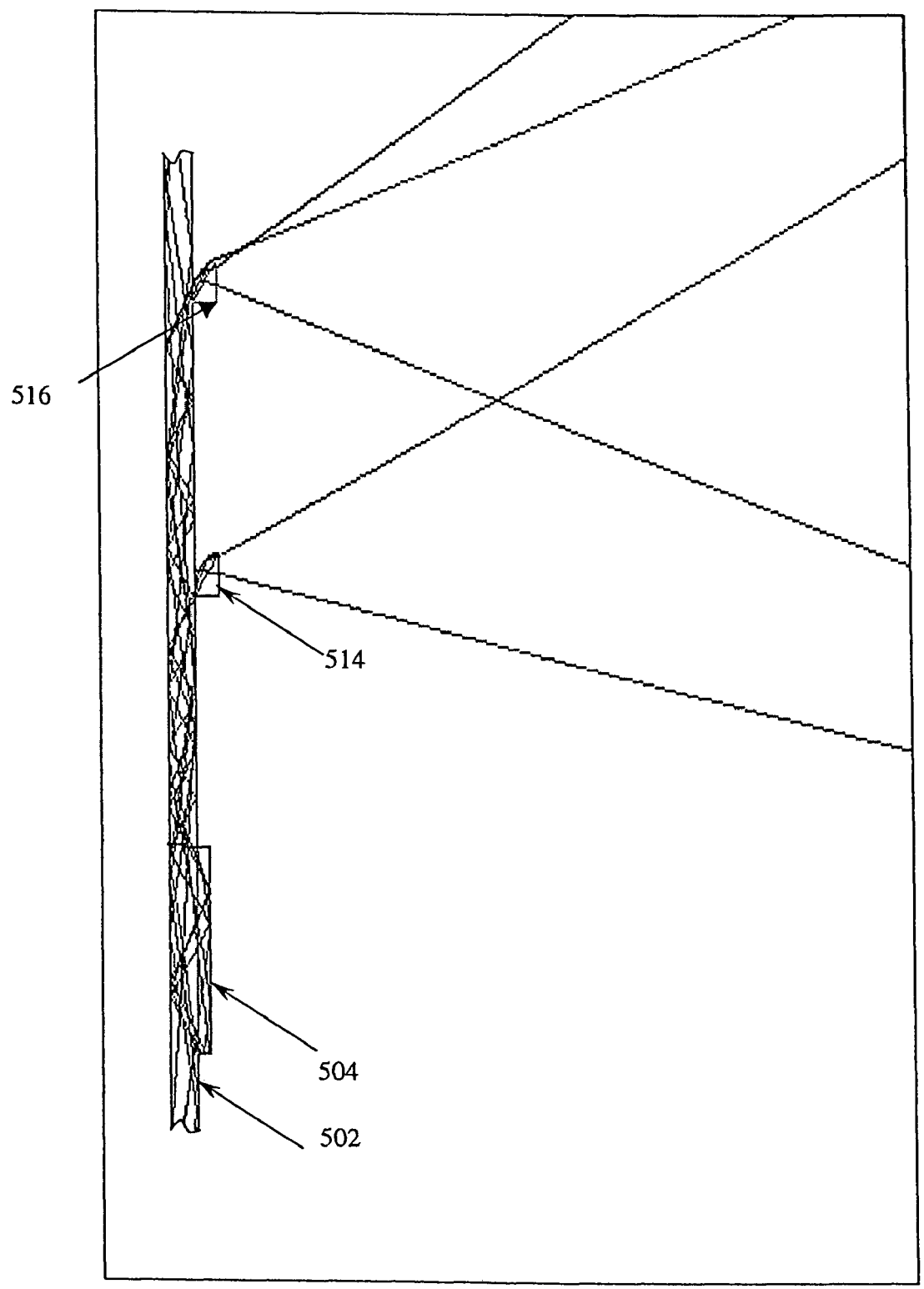
FIG. 19A is a ray trace pattern for a section of HOW-DOPI-DOPE system with multiple unidirectional injection and ejection ports distributed along a PRC.
Figure 19B:
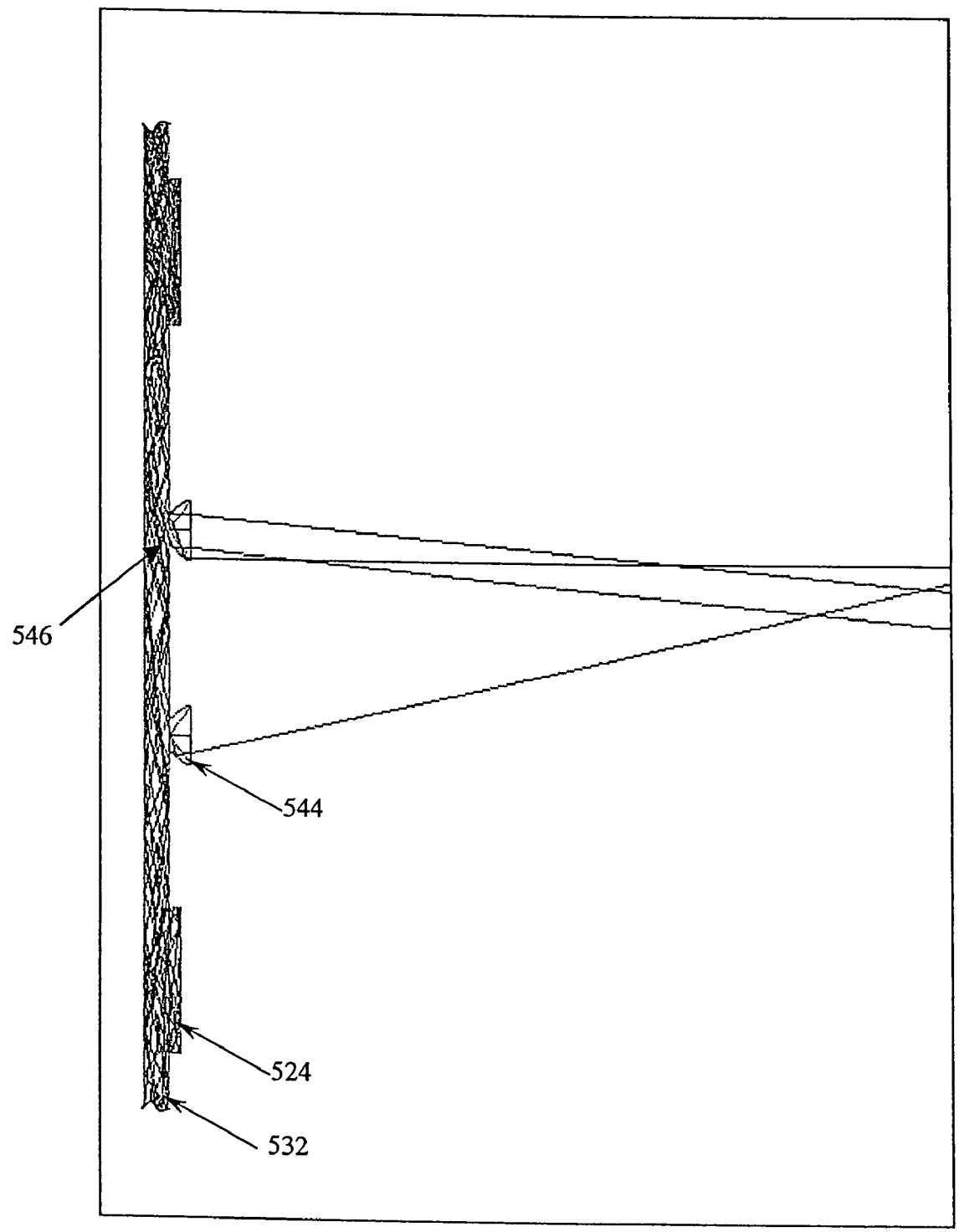
FIG. 19B is a ray trace pattern for a section of HOW-DOPI-DOPE system with multiple bidirectional injection and ejection ports distributed along a PRC.

Referring now to FIGS. 18A, 18B and the associated light ray tracings, FIGS. 19A and 19B, there is illustrated therein, respectively, exemplary embodiments of a unidirectional and bidirectional PRC-DOPI-DOPE system as described hereinabove. In FIG. 18A, the unidirectional PRC-DOPI-DOPE device 500 includes a PRC 502 which may be either square or rectangular in shape as in FIG. 16A, or as specifically illustrated may have a monofilament PRC radiation conduit device. Disposed around the PRC 502 is a unidirectional DOPI 504—that is, one in which the light sources 506 are disposed on a first face 508 of the DOPI, while a reflector element 510 is disposed on the DOPI face 512 opposite the first face 508. As in FIG. 16, the device 500 may have multiple ring shaped DOPI injection ports (though only two, 504 and 520 are shown in FIG. 18A) along its length. In addition, interspersed along the length of the PRC 502 are multiple, unidirectional DOPE ejectors 514, 516 designed to extract most of the flux injected from a proximate injector, as described hereinabove.

Similarly, in FIG. 18B, the bidirectional PRC-DOPI-DOPE device 530 includes a PRC 532 which again may be either square or rectangular in shape as in FIG. 16A, or as specifically illustrated may have a monofilament PRC radiation conduit device. Disposed around the PRC 532 is a bidirectional DOPI 534—that is, one in which the light sources 536 are disposed on a first face 538 of the DOPI, and second light source(s) 540 are disposed on the DOPI face 542 opposite the first face 538. As in FIG. 16, the device 500 may have multiple ring shaped DOPI injection ports 534 and 550 along its length. In addition, interspersed along the length of the PRC 532 are multiple, bidirectional DOPE ejectors 544, 546, 548 designed to extract most of the flux injected from a proximate injector, as described in FIG. 13 hereinabove. FIGS. 19A and 19B show a sample ray tracing of the unidirectional and bidirectional systems.

Consider now a number of practical embodiments of realistic PRC-DOPE-DOPI systems and compare their performance with conventional alternatives. In an LED backlight for 5"×3.75" LCD, breakthrough improvements in high-flux LED technology may enable LEDs to effectively enter the large area LCD backlighting market. However, as it will become apparent from the following analysis, the existing optical architecture has to be significantly improved before this debut occurs. Let us consider a 4" diagonal transmissive LCD for a PDA and other handheld devices. To calculate the required flux one can assume a target LCD luminance of 350 nit, 6.5% LCD transmittance, 1.5 BEF luminance enhancement factor (relative to a lambertian source) and a backlight overall light extraction efficiency of 0.8. Based on these figures the primary source flux is 171 lm. The flux can be produced by a single L or U shaped 1.6-2 mm diameter CCFL. Current super flux LEDs in a standard 7.6"×7.6" package have a maximal output of 3 lm (Red) and luminous efficacy of 14 lm/W. CCFLs with 10-40 cm length have 30-65 lm/W efficacy. One can conclude that in terms of lm/W, lm/dollar and device thickness, the state of the art LEDs are exceedingly inferior to CCFLs. Recently a white LED with 17 lm at 1.1 W has been developed with a 0.5×0.5 mm die. However, as explained above, a white LED may not be suitable for all backlight applications in view of relatively low efficacy, spectral characteristics and cost. Therefore in most existing designs, triads of RGB LEDs are directly coupled to the LPG's edge over its entire length. This coupling architecture produces considerable color non-uniformity, calling for a use of two sandwiched LGPs. Assuming 20 lm/W for a one watt, an RGB LED producing white color puts the number of required LED triads at nine.

Figure 20A:
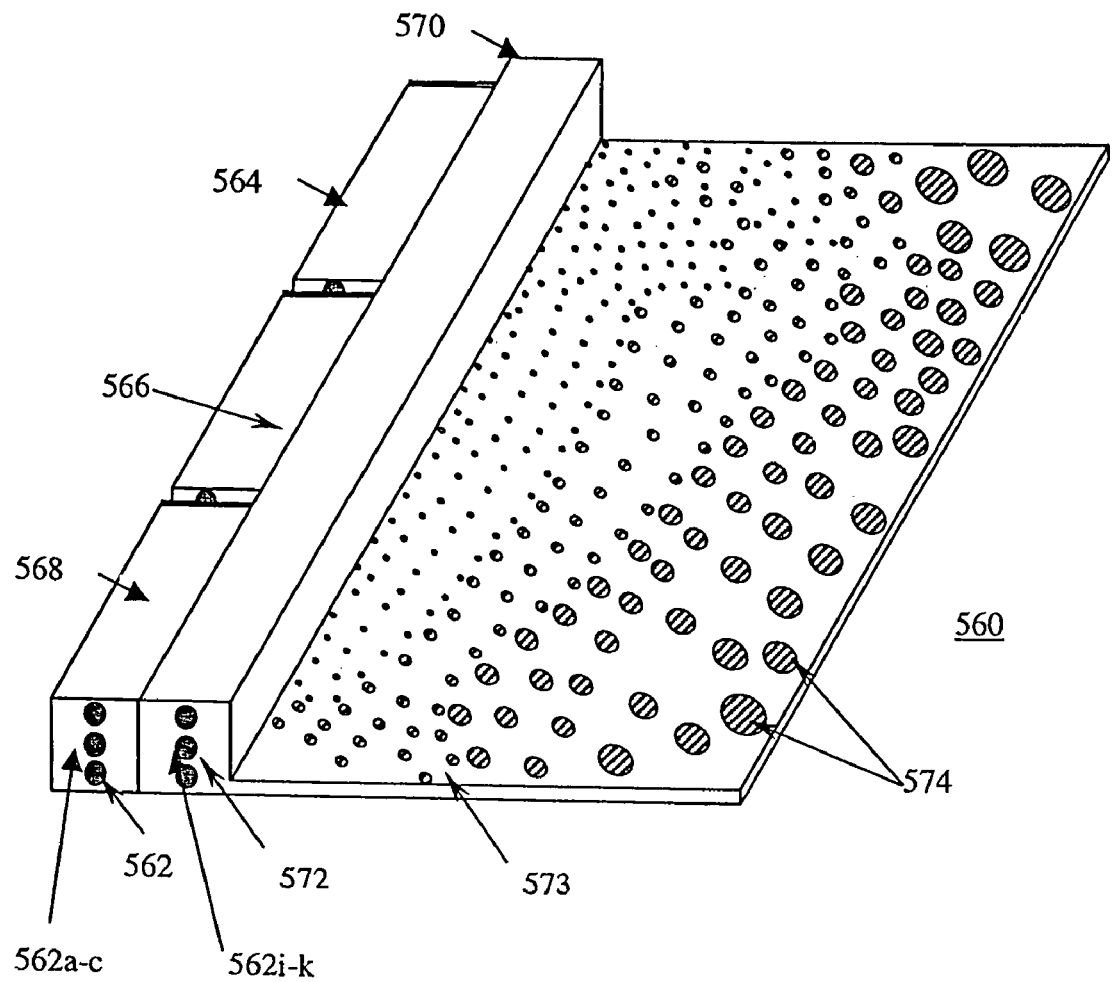
FIG. 20 illustrates a HOW-DOPI-Planar Distributed extractor system configured to provide LED backlighting for a transmissive LCD, in accordance with the instant invention.

Referring now to FIG. 20A there is illustrated therein a section of a bidirectional DOPI-planar DOPE backlight system 560. In this embodiment, the system 560 has 12 LEDs 562*a, b, c . . . j, k, l* coupled to four bidirectional DOPIs 564, 566, 568 and 570 and to two injection ports of the PRC 572. Note that the PRC and the DOPIs are as already described hereinabove in e.g., FIG. 19. Note further that the SRC 573 in FIG. 20A may be the substantially planar SRC illustrated in e.g., FIG. 2C, including the distributed light extractors 574. In addition, LEDs 562*d, e, f, g, h, i* are not shown as they are obscured by DOPIs 566 and 568. With a 7.6 mm LED lamp the PRC-DOPI is 15 mm wide (X) and 23 mm high (Z). While the DOPE's thickness is only 1-2 mm, hence an injection module should be reduced. This can be done, for example, by packaging three RGB chips of a modified SM type on a single substrate and coupling them directly to a DOPI with a foconic coupling section, all as described hereinabove. These dies may be 0.5×0.5 mm, so that with a 0.5 mm gap required to reduce self-absorption, the whole package becomes 1×3.5 mm and can produce 25-40% higher external LED efficiency due to optimized coupling. The injection module is now only 7×5 mm and planar DOPE is less than 1 mm thick. By using several less powerful smaller LEDs one can further reduce the dimensions of the backlight.

Figure 20B:
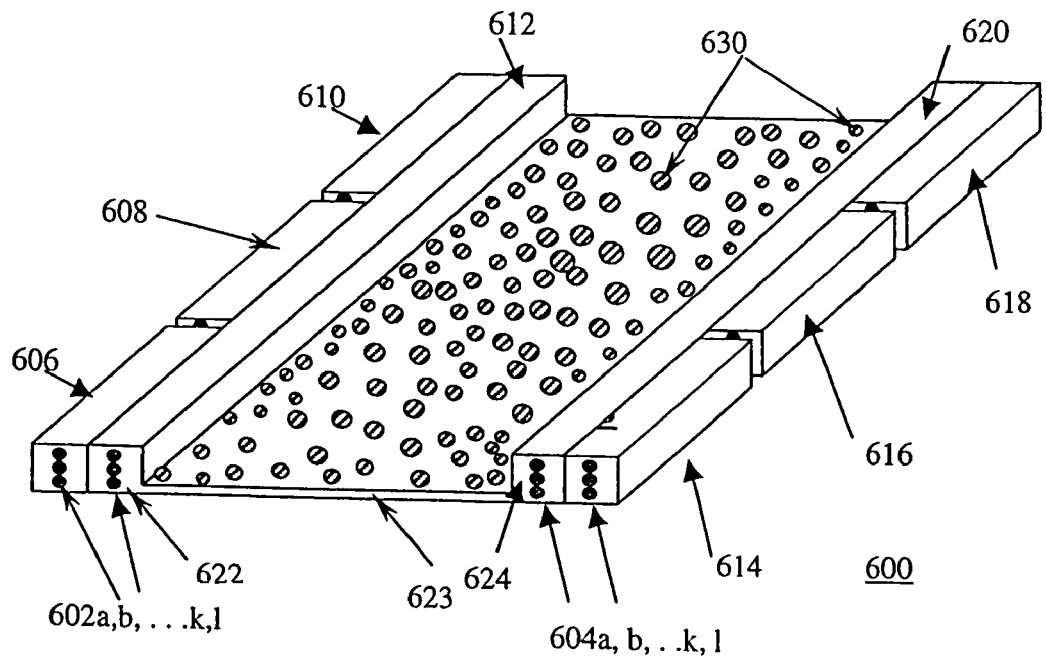

With an improved LED efficacy of 40 lm/W, the number of LEDs can be reduced to four. Referring now to FIG. 20B there is illustrated therein a double DOPI-planar DOPE backlight 600 having 0.2 mm thickness and 5×2.5 mm foconic PRC. Note that the overall configuration of backlight 600 is similar to that illustrated in FIG. 6B, except that this embodiment has several features described with respect to FIG. 20A. Specifically, in this embodiment, the backlight 600 has 24 LEDs 602 *a, b, c . . . j, k, l* and 604 *a, b, c . . . j, k, l* coupled to respectively eight bidirectional DOPIs 606, 608, 610, 612, 614, 616, 618 and 620 and to four injection ports of the PRCs 622 and 624. Note that the PRC and the DOPIs are as already described hereinabove in e.g., FIG. 19. Note further that the SRC 623 in FIG. 20B may be the substantially planar SRC illustrated in e.g., FIG. 2C, including the distributed light extractors 630. In addition, LEDs 602 *d, e, f, g, h, i* and 604 *d, e, f, g, h*, and *i* are not shown as they are obscured by DOPIs 606 and 608 and 614 and 616 respectively.

One can summarize the preceding analysis by concluding that the described LED packaging and coupling architecture in conjunction with effective flux ejection system brings LED backlights within the realm of practical applications.

Next let us consider the embodiment of a practical PRC-DOPE-DOPI system, as shown in FIG. 18 and compare its performance with a conventional LP alternative. With a circular PRC of 1 cm diameter a ring-shaped DOPE should have a thickness of 10/5=0.2 cm and a length of 0.2*20=4 cm. One should also add one cm to this distance for mounting LED lamps. Assuming that a total length of the device is 10 meters, then the number of DOPIs coupled to the system is 10/0.05+1=201. Taking into account that a total cross sectional area of the system is 1.44 larger compared to a conventional LP gives a factor of 201/1.44=140. This factor is termed Numerical Aperture Magnification Factor (NAMF). It means that PRC-DOPI-DOPE enables to pump 140 times more flux into an LP of the same diameter as a conventional system. Alternatively, its diameter can be 12 times smaller to accept the same flux.

In addition, a conventional LP from a high—grade material with an internal extinction factor of 0.001 1/cm absorbs at least 50% of the flux, bringing Effective Aperture Amplification Factor (EAAF) to 140/0.5=280. PRC-DOPI-DOPE extracts light over 4 cm without any losses. Factoring in an intensity amplification factor of directional DOPI takes EAF to 1000-5600. In fact EAF can be larger, as a flux in a conventional LP travels over long distance and is subjected to an accumulated scattering, caused by defects, impurities, N irregularity etc. of the LP material.

Figure 21:
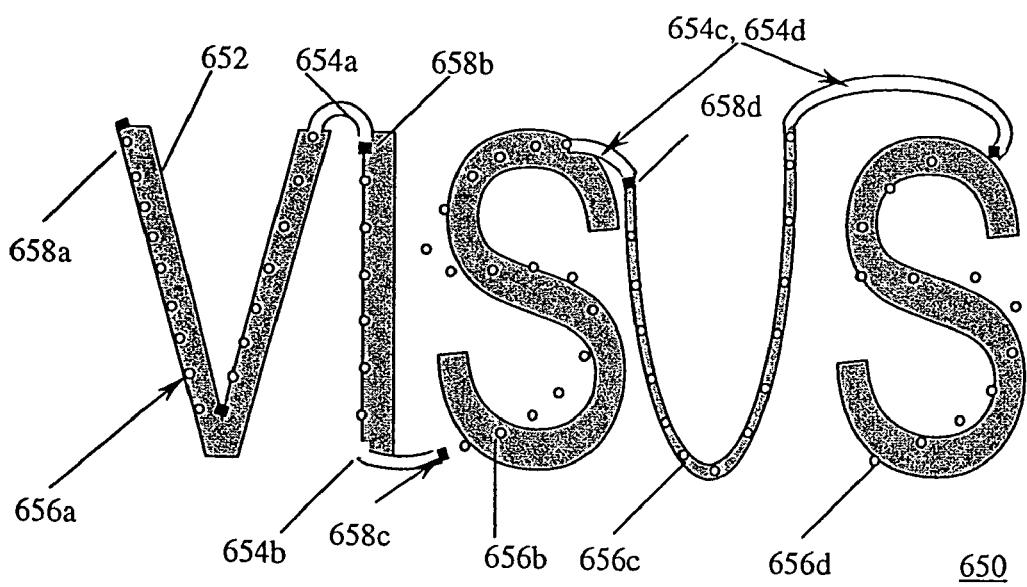
FIG. 21 illustrates a HOW-DOPI-DOPE system configured for signage applications, in accordance with the instant invention.

A practical, though not precisely to scale depiction of a PRC-DOPI-DOPE device in a signage application 650 is illustrated in FIG. 21. In the embodiment, the word "Visus" is depicted with a single continuous PRC 652 having non-active sections 654*a*, 654*b*, 654*c*, and 654*d* from a standard "Letraset" of individual symbols. DOPE elements e.g., 656*a*, 656*b*, 656*c*, and 656*d* are disposed regularly along the length of the PRC (note that there are many more DOPE elements illustrated in FIG. 21, and that these four are identified for convenience only). Similarly, a number of DOPI elements 658*a*, 658*b*, 658*c*, and 658*d* are disposed regularly along the length of the PRC (note again that there are more DOPI elements illustrated in FIG. 21, and that these four are identified for convenience only).

Decoupled HOW Systems.

Consider now another class of HOW systems which do not have an optical coupling between some Qr all of their sub-elements. This class of devices is termed decoupled HOW (D-HOW). Various exemplary embodiments are depicted in FIGS. 22A to 22D, showing a cylindrical PRC—planar SRC combination, similar to a HOPE device for LCD backlighting applications, which has been considered above. In these embodiments however, the two fundamental elements are not directly optically coupled. For some devices, such decoupling can reduce manufacturing complexity. Since there is no direct flux transfer between PRC and SRC, PRC is modified by adding its own light extraction means, so that the extracted light can be coupled into the SRC through an air interface and then finally extracted into SRC's illumination window. Thus, PRC and SRC have independent extraction means, which act mutually to ensure a required luminance distribution.

Figure 22A:
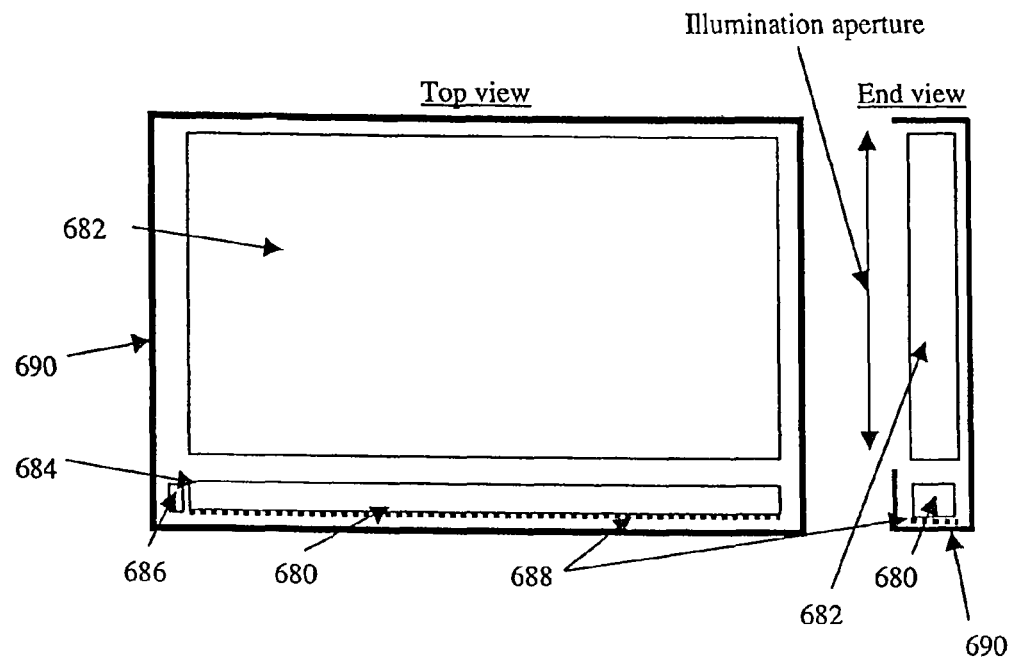
FIG. 22A illustrates a decoupled HOW PRC—Planar Distributed extractor system with PRC having distributed light extraction devices, in accordance with the instant invention.
Figure 22B:
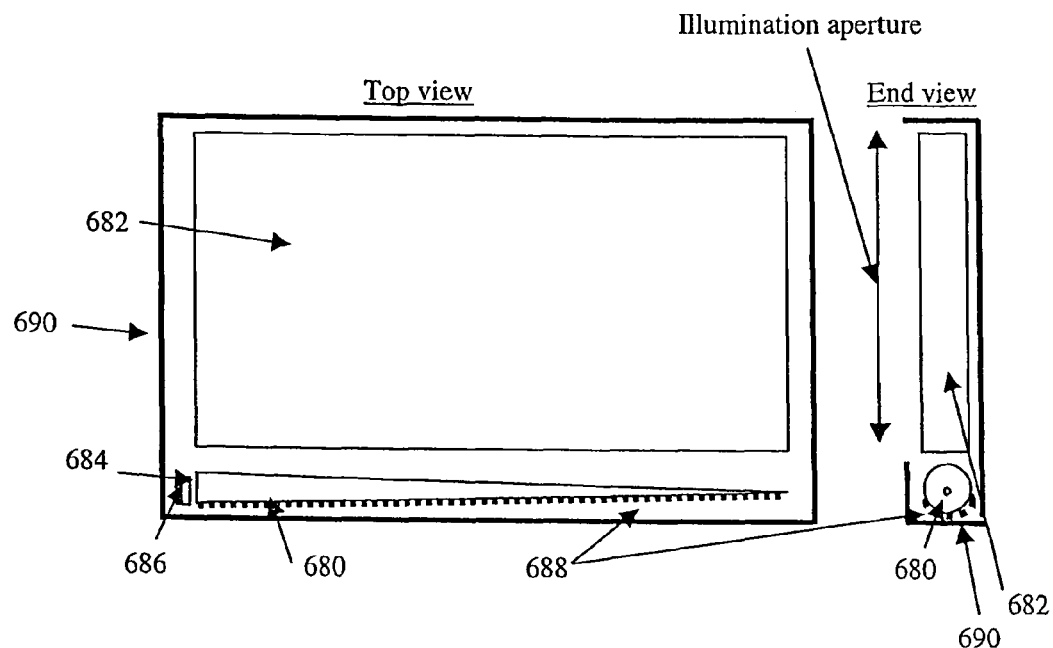
FIG. 22B illustrates a decoupled HOW PRC—Planar Distributed extractor system with wedge shaped PRC and distributed light extraction means, in accordance with the instant invention.
Figure 22C:
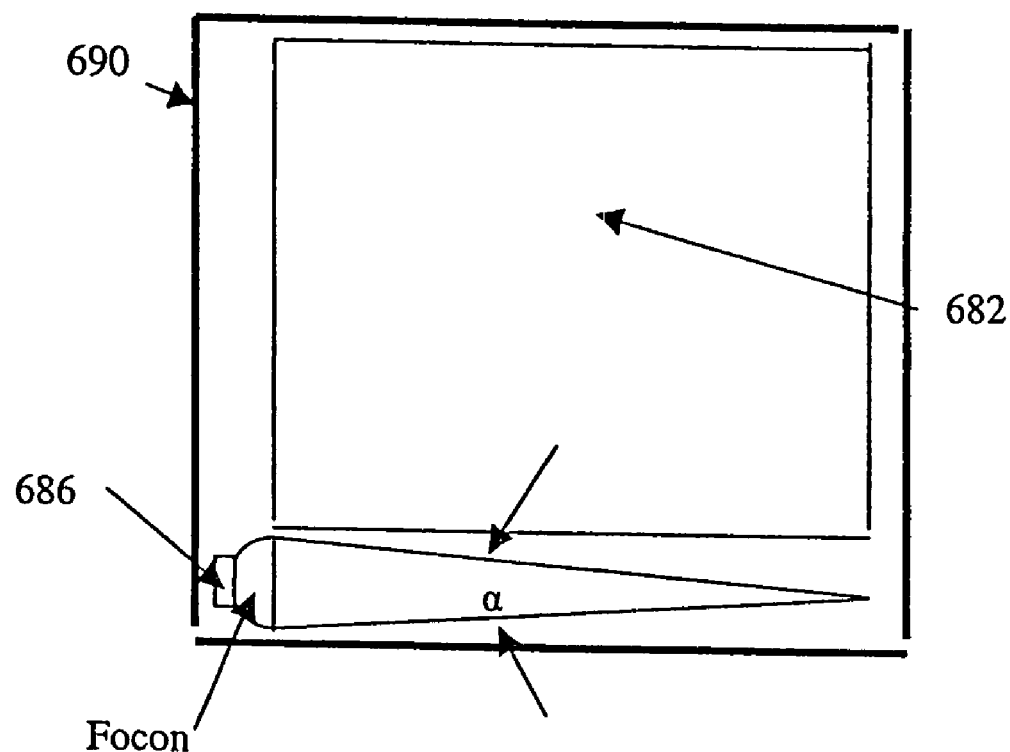
FIG. 22C illustrates a decoupled HOW PRC—Planar Distributed extractor system with wedge shaped PRC having distributed light extraction means and a foconic coupling section, in accordance with the instant invention.
Figure 22D:
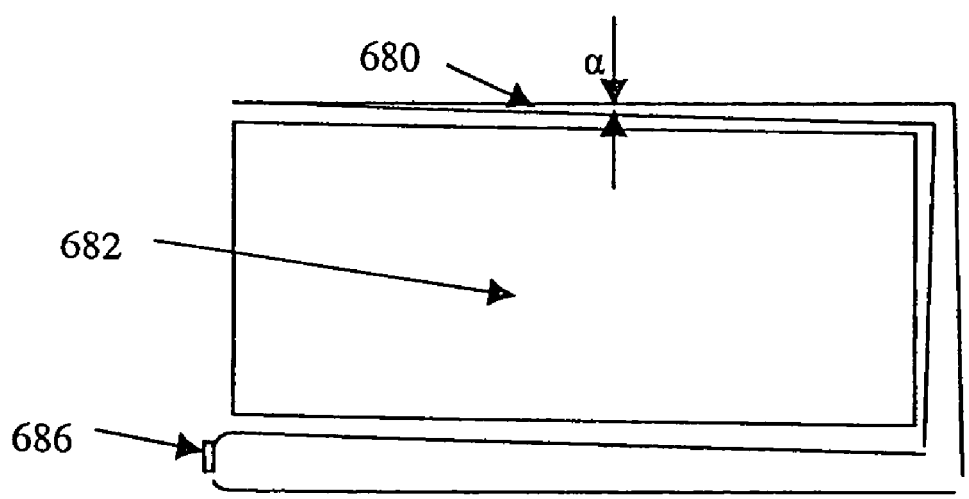
FIG. 22D illustrates a decoupled HOW PRC—Planar Distributed extractor system with U shaped wedge PRC having distributed light extraction means and a foconic coupling section, in accordance with the instant invention.

In the embodiments of FIG. 22, FIGS. 22A and 22B both include top and end views of the embodiment, both of which will be referred to herein. The PRC has a configuration of a light guiding rod (LGR) 680, which is a light coupling device particularly suitable for large backlights with large aspect ratios. A LGR is an elongated light-transmitting rod, disposed parallel and proximate to an edge of the LGP 682 and having an entrance aperture 684 at one end, to which the light source 686 (preferably an LED) is optically coupled. Similar to PRC, the LGR is made of a monolithic transparent dielectric material with a possibly high refraction index and can have any cross-sectional shape, such as circular, elliptic, rectangular, etc, all as illustrated in FIGS. 23A-23C. The LGRs cross-sectional area may be constant, as in FIG. 23B, or preferably tapered, as in FIGS. 23A and 23C. More preferably, the taper is non-linear, as shown, for example, in FIG. 23D (in conjunction with a foconic coupling section), where the taper ends with a very small diameter, $Z_{min}$. Preferably the LGR is directly coupled to the LED emitter or bonded to an existing LED encapsulating optics by an index matching optical bonding material. The LGR may be considered to be a specially configured primary optics of the LED and can constitute an integral part thereof, being attached directly during LED manufacturing, in place of a conventional lens-shaped encapsulent. The LGR may also include light extractors 688 as described hereinabove along at least one side thereof. A reflector 690 may also be disposed around the device to redirect stray flux.

FIG. 23D depicts an exemplary embodiment of a foconic nonlinearly expanding coupling section 692 (similar to the one described above for coupling a LED to a PRC) between the LED and the main body of an LGR, which functions to reflect all of the LED flux and constrict it within a NA of the PRC, so that it propagates along the PRC solely by TIR. For a longer LGR (larger length/diameter ratio) the coupling section preferably has a quasi-parabolic shape, in order to maximally collimate the internal flux, so that it reaches the other end of the rod with a minimal number of TIRs and therefore—along a shortest path length, assuring minimal losses and larger flux density at more distant sections along the LGR. Since a quasi-parabolic shape of coupling section results in a larger LGR diameter, a selection of an optimal LGR shape should be based on a consideration of a trade-off between its photometric performance and geometrical constraints.

Light is extracted from the LGR by any of the known techniques, which should be specially adapted with respect to their density distribution function. These methods include diffuse coating, surface roughening in a random or regular pattern, holography, using weakly forward scattering material, PRC aperture contraction in a controlled manner etc. The light extracted from a PRC is coupled into the proximate edge of the SRC. In order to produce a uniform extraction along a complete length of the LGR and to prevent extraction in a backward direction towards the LED, the pattern of the extractors should have a specially designed cover ratio distribution.

Light extraction can also be effected by using linearly or nonlinearly tapered rods, with a small inclination angle of between 0.001 and 10 degrees. The inventor has developed special automatic software algorithms, which automatically find optimal extractor geometry and density in a series of iterations. Since the light is ejected from the LGR in all directions, it should have a reflective cladding, such as high-grade PET reflectors with 0.95-0.97 reflectance). However, the SRC can still be considerably thinner than the LGR. Since the LGR does not absorb any light, the coupling aperture can be made sufficiently thin. In existing backlights with CCFLs the LGP thickness should be relatively large (1.5-2 lamp diameters), since the light is absorbed during multiple passes (MIR) through the lamp's phosphor coating.

Such an LGR in effect transforms a point-like (i.e. LED) lamp into a linear tubular source, similar to a hot—or cold cathode fluorescent lamp (HCFL or CCFL). It is known in the art, that with such an elongated source one can produce uniform luminance over the SRC. Moreover, the LGR also serves as an effective color-mixing device, owing to multiple virtual sources created by the TIRs, as the light travels along the LGR. This, in turn, effects absolute color uniformity over the illumination aperture, which, as noted above, is critical for color display.

In an embodiment illustrated in FIG. 23E, two light sources 686a and 686b are placed at the two ends of a cylindrical LGR 680, to increase the brightness. These two light sources could also be a green LED at one end and a red LED at the other end, or any other combination, by appropriately controlling extraction distribution along the LGR.

HOPE Based Optical Commutation-Distributive Devices.

HOPE offers a new approach to realize a broad range of distributive devices in fiber optics local and corporate communication networks, such as various types of couplers, connectors, micro-transceivers, micro-repeaters, multiplexers, amplifiers, attenuators etc. They are particularly suitable for integration in a variety of planar optical devices and planar wave guide technology. In conventional devices the coupling is made directly from the exit aperture of the main fiber and suffers from the well-known shortcomings, such as coupling losses, backward reflected flux, signal degradation etc.

Figure 24:
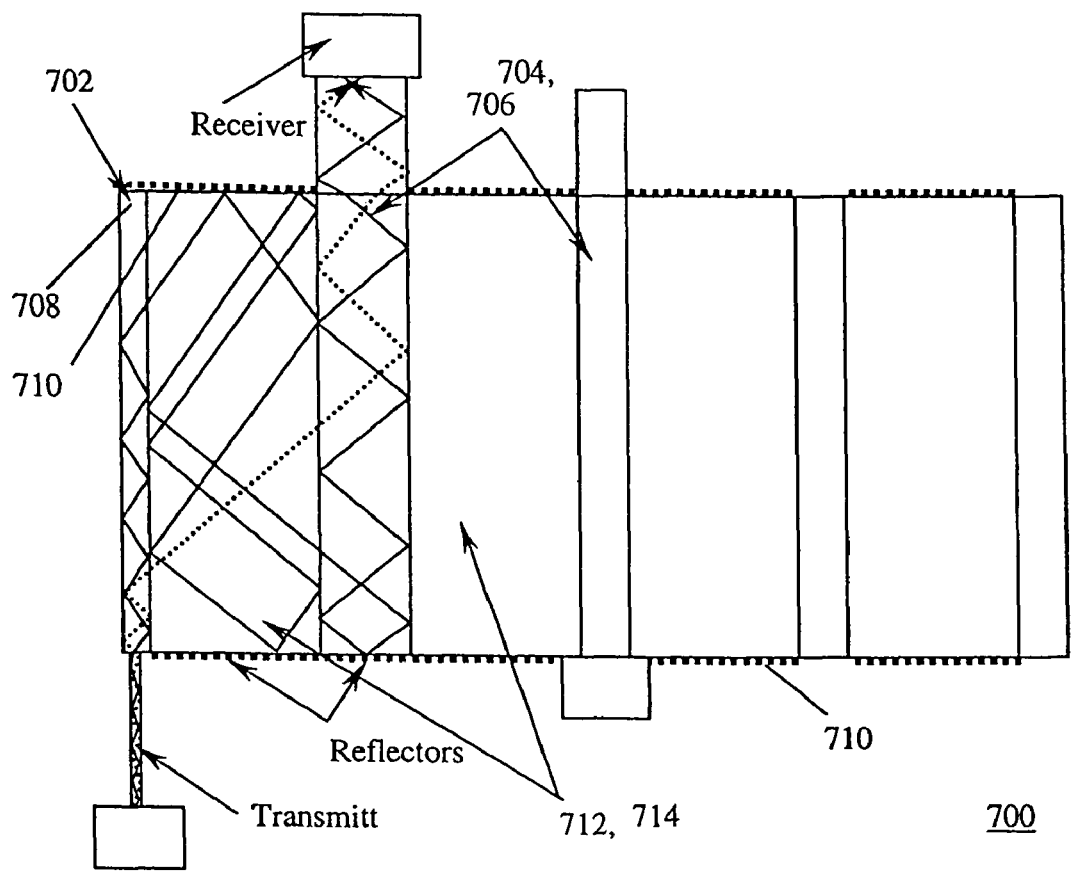
FIG. 24 illustrates a HOW coupling—multiplexing device containing one APRC and multiple PPRC with different cross sectional area, in accordance with the instant invention.

Consider a most general multiple HOPE (M-HOPE) system 700, depicted in FIG. 24. It comprises:

Multiple PRCs with parallel Y axis;

Planar multiple SRCs intercoupling PRCs.

Any number of PRCs are coupled through their injection apertures to the "source" fibers, carrying the modulated optical radiation, or can constitute a stretch of a given length $Y_{coupling}$ of a source fiber. They are termed "active" PRC (APRC) 702. The rest of PRCs are termed passive PRC (PPRC) 704 and 706. The second (exit) aperture 708 of APRCs can be left opened, or covered by any opaque or reflecting device 710 which may also cover other surfaces of both the SRCs and the PRCs. Diameters of each individual PRC and the thickness of each individual SRC 712, 714 can vary within any range of values. The width X of SRCs can also vary within any range of values X=>0. The only limitation is that Z of SRC should be smaller than Z of PRC.

The flux can be simultaneously ejected through any of the opened apertures of PRCs of both types (passive and active). A complex radiation transfer process, taking place in such a system determines the flux ejected through a particular PRC. Since the solution of an integral equation describing a radiation transfer is not practical or possible, the inventor developed special finite difference numerical methods in order to describe a behavior of the system. The methods are similar to a certain degree to the methods for computing irradiance distribution in the cavital reflecting systems having MIRs. However, instead of form factors one should use transitional entry-reentry probability of flux exchange between multiple PRCs. In principle, any distribution of ejected flux among PRC ejection ports can be obtained by selecting the relative configurations of individual PRCs and SRCs.

Figure 25A:
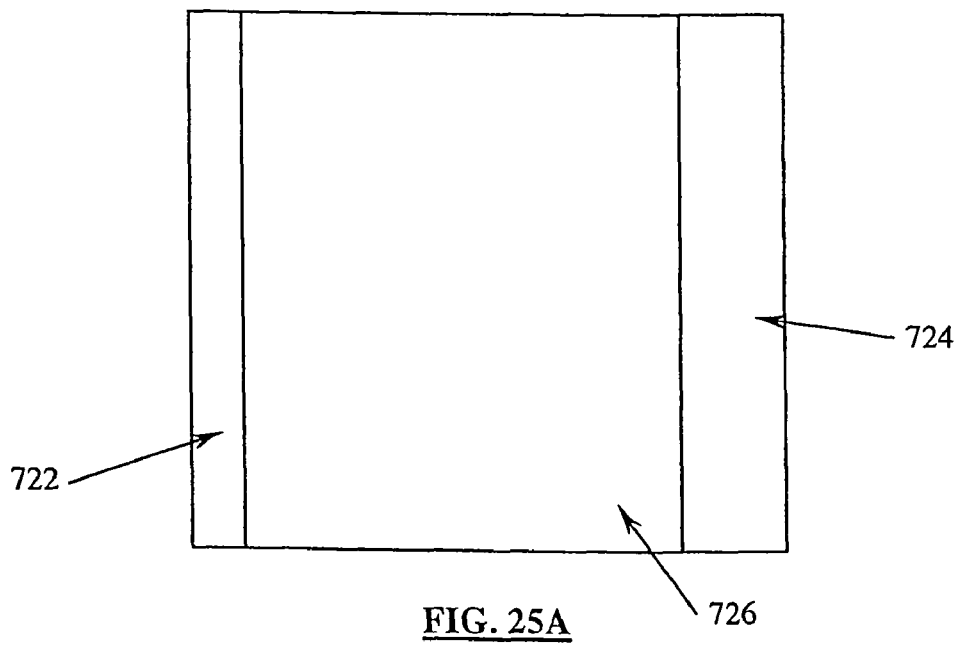
FIG. 25A illustrates a HOW coupling device containing one APRC and one PPRC with a large cross sectional area, in accordance with the instant invention.

Consider, by the way of example, a number of embodiments. FIG. 25A shows an ensemble of two PRCs—an APRC

722, and a PPRC 724, which are coupled by a planar SRC 726. The radiation transfer between two PRCs is accomplished through a narrow coupling slit formed by a SRC, as described hereinabove. As a limiting case, representing a conventional coupling, two PRCs can be directly coupled, i.e., $X_{SRC}=0$. Such a system enables one to reroute (forward) and eject any desired fraction from the APRC through one or both apertures of the PPRC. In a steady state the flux subdivision between forward apertures of both PRCs is determined by the product of entry-reentry transitional probabilities of photons through the coupling slit aperture integrated over the coupling length Yc. If Yc is sufficiently long the flux subdivision is exactly 50%-50%. For shorter Yc less than 50% will be coupled into a PPRC. The exact subdivision value can obtained by selecting a proper Yc and $X_{src}$.

Figure 25B:
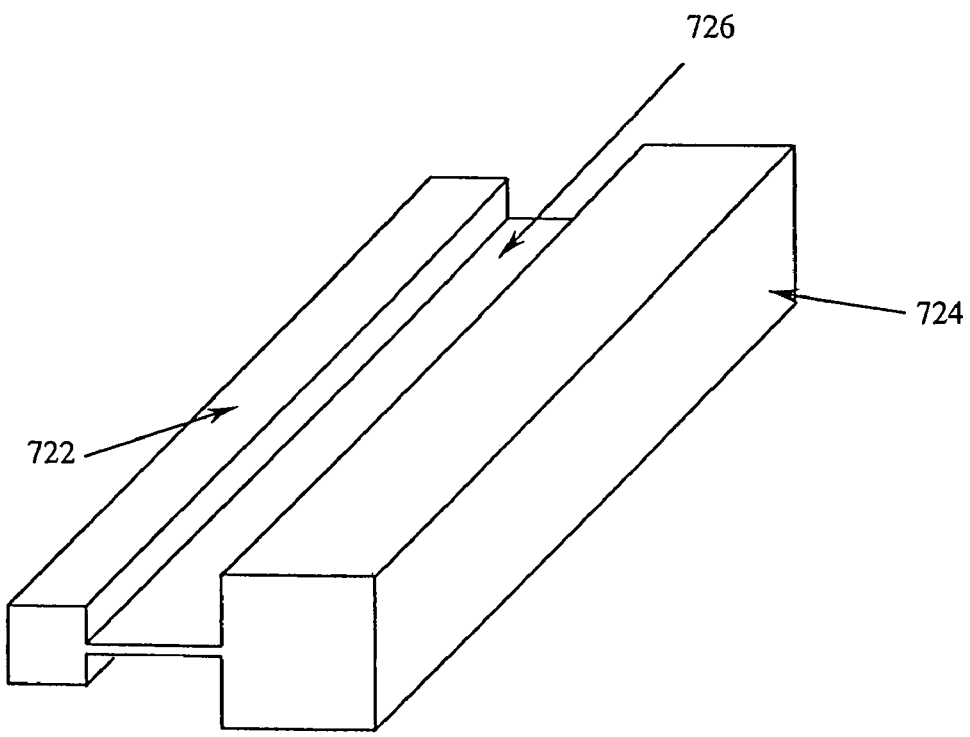
FIG. 25B is a 3-D view of the HOW coupling device of FIG. 25A, containing one APRC and one PPRC with a large cross sectional area, in accordance with the instant invention.
Figure 26A:
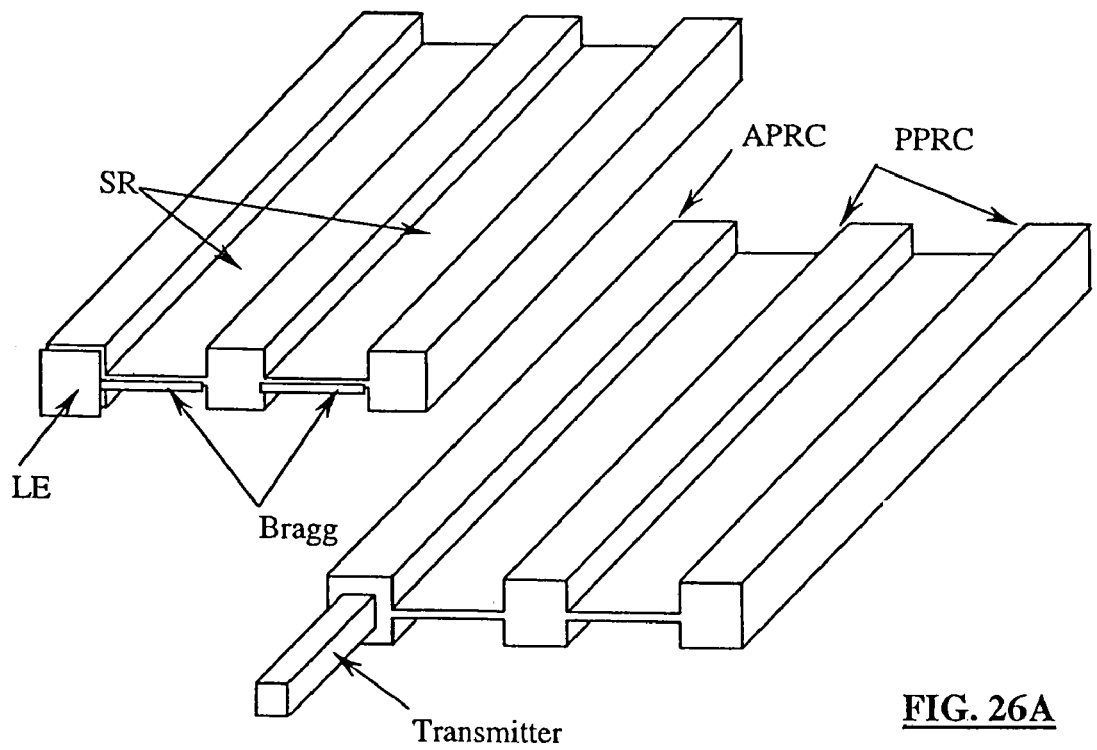
FIG. 26A is a 3-D view of a HOW coupling device containing one APRC and two PPRCs with an equal cross sectional area, in accordance with the instant invention.
Figure 26B:
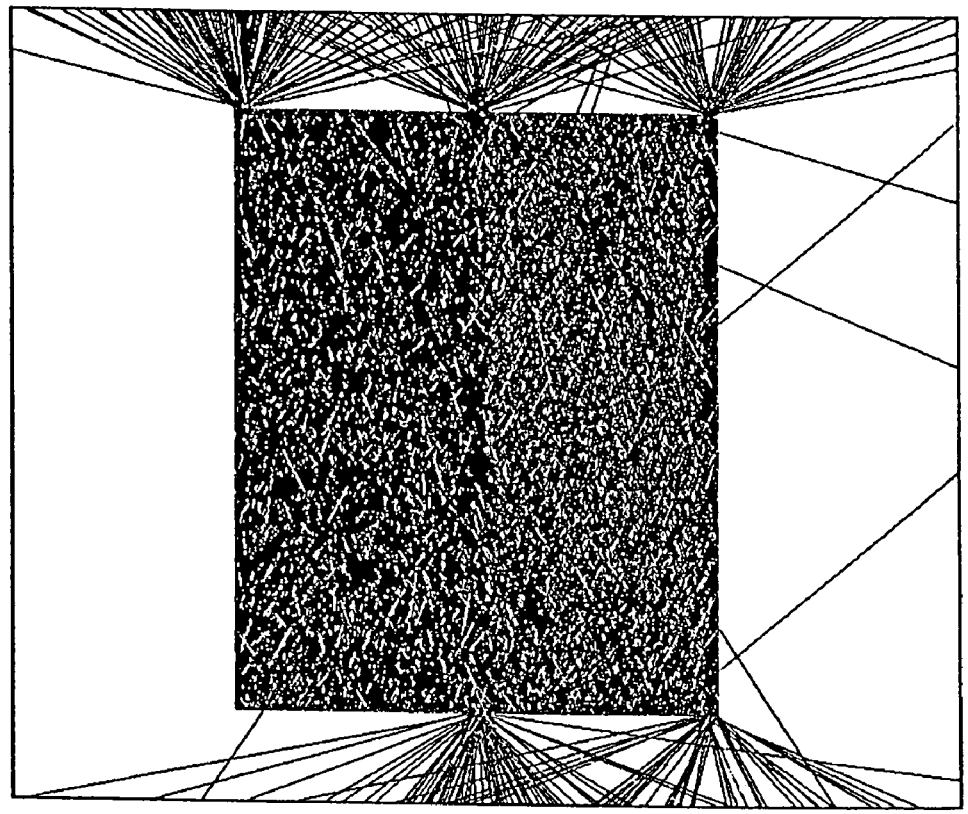
FIG. 26B is a ray trace pattern for a HOW coupling device as depicted in FIG. 26A.
Figure 26C:
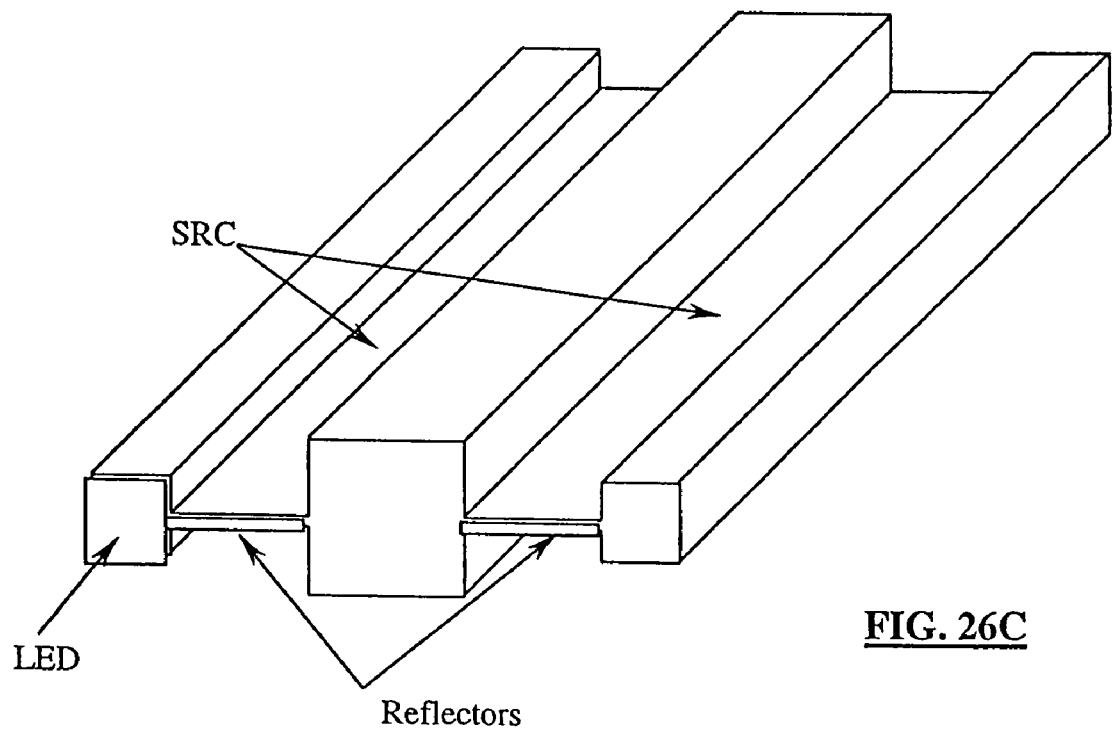
FIG. 26C illustrates a 3-D view of a HOW coupling device containing one APRC and two PPRCs with non-equal cross sectional area, in accordance with the instant invention.
Figure 26D:
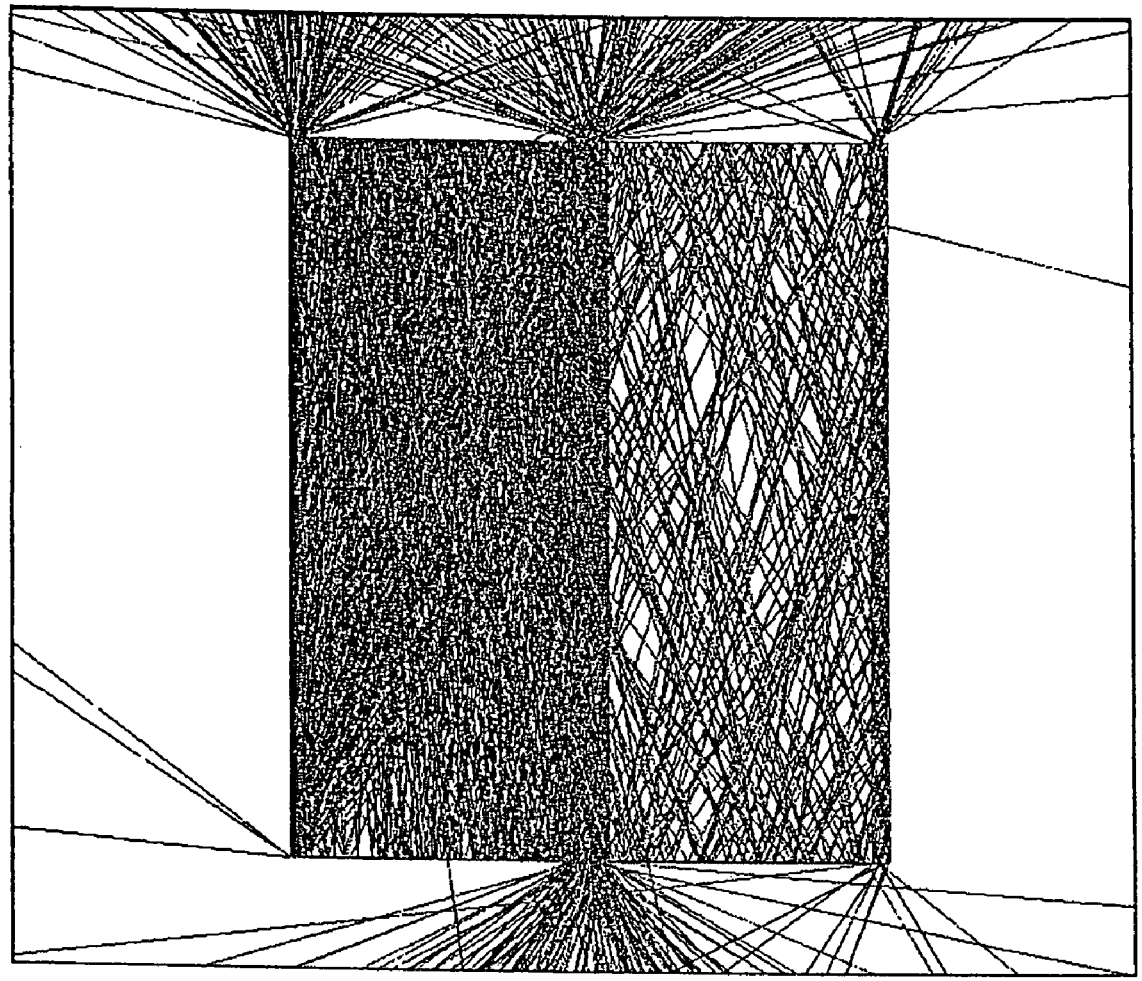
FIG. 26D is a ray trace pattern for a HOW coupling device depicted in FIG. 26C.

Note that all the modes present in APRC are fully restored upon entering PPRC for any intervening SRC. The mode dispersion caused by a small difference of ray passes is minimal. It can be concluded that in a two PRC configuration no more than 50% of the flux can be transferred from APRC into PPRC with an equal cross sectional area through a planar SRC. However, if the cross section of the PPRC 724 is made larger, as shown in FIG. 25B, all the radiation can be channeled into it. Indeed, the transitional photon entry-reentry probabilities become not equal, so that most or all of the flux will remain "trapped" in the PPRC after being coupled into it. Simultaneously changing both Yc, thickness Z of individual APRC, PPRC and SRCs adds virtually unconstrained degrees of freedom and allows obtaining any desired subdivision of the signal energy. It is important to realize that the subdivision does not cause any backward reflected flux in an APRC and various coupling losses inherent to prior art devices.

A two PRC scheme can be extended to a multiple PRC system, as shown and described in FIG. 24. By selecting individual Yc, diameter of each PRC, Xsrc, Zsrc and by allowing some of the flux to escape through any ejection apertures of each PRC, the initial flux, flowing in APRC can be forwarded (and eventually ejected) into any number of ejection ports at any multiple subdivision ratios. Examples of such systems with one APRC and two PPRCs with an accompanying race tracing graphs are shown in FIG. 26A to 26D.

A monolithic HOW-DOPI configuration depicted in FIGS. 24-26 allows one to implement various multiple signal coupling and repeater devices without a need for aperture to aperture coupling used in conventional systems. Systems with various geometry and coupling architecture and different refraction indexes N can be effectively imbedded into a planar technology.

In conclusion, while exemplary embodiments of the invention have been illustrated and described, it will be clear that the invention is not so limited. Numerous modifications, changes, variations, substitutions, and equivalents will occur to those skilled in the art, without departing from the spirit and scope of the present invention as defined by the appended claims.

I claim:

1. An optical waveguide comprising: a distributed optical pipe light ejector and an elongated primary radiation carrier, said radiation carrier comprising an elongated cylindrical optical pipe conducting light along the length of said pipe and at least one light source coupled to at least one end of said primary radiation carrier; and said distributed optical pipe light ejector comprising a ring-shaped cylindrical element disposed around and optically coupled to a portion of said primary radiation carrier, said ejector further including edge members extending therefrom extracting light from said cylindrical optical pipe within a defined angular cone around the normal to the axis of said cylindrical optical pipe.

2. A waveguide as in claim 1, including a plurality of ejector elements disposed along said primary radiation carrier.

3. A waveguide as in claim 1, wherein said ejector elements are unidirectional.

4. A waveguide as in claim 1, wherein said ejector elements are bidirectional.

5. A waveguide as in claim 1, wherein said ejector elements may be both bidirectional and unidirectional.

6. A waveguide as in claim 1, further including a foconic coupling section disposed between said light source and said primary radiation carrier.

7. An optical waveguide comprising: a distributed optical pipe light injector and an elongated primary radiation carrier, said radiation carrier comprising an elongated cylindrical optical pipe conducting light along the length of said pipe and said distributed optical pipe light injector comprising a ring-shaped cylindrical element disposed around and optically coupled to a portion of said primary radiation carrier, said injector further including at least first and second vertical edges extending therefrom and at least one light source coupled to at least one edge thereof.

8. A waveguide as in claim 7 further including a plurality of directional injectors disposed along the length thereof.

9. A waveguide as in claim 7, further including a reflector means disposed on the edge of said injector not coupled to said light source.

10. A waveguide as in claim 7 further including a light source coupled to both edges of said injector.

11. A waveguide as in claim 7 further including at least one light source coupled to said primary radiation carrier.

* * * * *